(12) United States Patent
Saitoh et al.

(10) Patent No.: US 11,945,034 B2
(45) Date of Patent: Apr. 2, 2024

(54) CUTTING INSERT AND CUTTING EDGE REPLACEMENT TYPE CUTTING TOOL

(71) Applicant: MOLDINO Tool Engineering, Ltd., Tokyo (JP)

(72) Inventors: Hiroto Saitoh, Narita (JP); Syoujirou Touma, Narita (JP)

(73) Assignee: MOLDINO TOOL ENGINEERING, LTD., Tokyo (JP)

( * ) Notice: Subject to any disclaimer, the term of this patent is extended or adjusted under 35 U.S.C. 154(b) by 596 days.

(21) Appl. No.: 16/972,147

(22) PCT Filed: Apr. 19, 2019

(86) PCT No.: PCT/JP2019/016814
§ 371 (c)(1),
(2) Date: Dec. 4, 2020

(87) PCT Pub. No.: WO2019/235084
PCT Pub. Date: Dec. 12, 2019

(65) Prior Publication Data
US 2021/0237170 A1 Aug. 5, 2021

(30) Foreign Application Priority Data

Jun. 8, 2018 (JP) ................................. 2018-110398

(51) Int. Cl.
*B23C 5/16* (2006.01)
*B23B 27/22* (2006.01)
(Continued)

(52) U.S. Cl.
CPC ............ *B23B 27/22* (2013.01); *B23C 5/1027* (2013.01); *B23C 5/202* (2013.01); *B23C 2240/24* (2013.01)

(58) Field of Classification Search
CPC .................. B23B 27/22; B23B 27/141; B23B 2200/0409; B23C 5/202;
(Continued)

(56) References Cited

U.S. PATENT DOCUMENTS 5,193,947 A * 3/1993 Bernadic ............... B23B 27/143
D15/139
5,215,415 A 6/1993 Fukuoka et al.
(Continued)

FOREIGN PATENT DOCUMENTS

CN 101513680 A 8/2009
CN 101626860 A 1/2010
(Continued)

OTHER PUBLICATIONS

International Search Report dated Jul. 23, 2019, issued for PCT/JP2019/016814 and English translation thereof.
(Continued)

*Primary Examiner* — Sara Addisu
(74) *Attorney, Agent, or Firm* — Locke Lord LLP

(57) ABSTRACT

What is presented is a cutting insert including a polygonal plate-shaped insert main body that includes: two polygonal surfaces; a side surface; and a cutting edge, the insert main body has a mounting hole that is centered on an insert center line passing through centers of the two polygonal surfaces, the cutting edge includes a major cutting edge extending from a first end of a corner edge located at a corner of the polygonal surface, and, in the opening of the mounting hole, a plurality of protrusions protruding with respect to a boss surface around an opening of the mounting hole are formed at intervals in a peripheral direction in an inner periphery side region of the major cutting edge.

12 Claims, 27 Drawing Sheets

(51) Int. Cl.
*B23C 5/10* (2006.01)
*B23C 5/20* (2006.01)
*B23C 5/22* (2006.01)

(58) Field of Classification Search
CPC ....... B23C 2200/0411; B23C 2200/081; B23C 2200/323; B23C 5/205; B23C 2200/369; B23C 5/1027; B23C 2240/24; B23C 5/06; B23C 2200/361
See application file for complete search history.

(56) References Cited

U.S. PATENT DOCUMENTS

| | | | |
|---|---|---|---|
| 6,146,065 A | 11/2000 | Isaksson | |
| 8,177,460 B2* | 5/2012 | Satran | B23C 5/2213 407/66 |
| 8,485,764 B2 | 7/2013 | Xu | |
| 8,858,130 B2* | 10/2014 | Morrison | B23C 5/06 407/62 |
| 8,858,131 B2* | 10/2014 | Scheicher | B23B 27/145 407/113 |
| 9,050,667 B2* | 6/2015 | Park | B23C 5/22 |
| 9,770,767 B2* | 9/2017 | Shibata | B23C 5/2213 |
| 10,022,803 B2* | 7/2018 | Yamaguchi | B23B 27/145 |
| 10,029,317 B2* | 7/2018 | Kawasaki | B23B 27/141 |
| 10,343,226 B2* | 7/2019 | Yoshida | B23C 5/202 |
| 10,406,608 B2* | 9/2019 | Brown | B23C 5/2213 |
| 2010/0179555 A1 | 7/2010 | Ishida | |
| 2014/0010605 A1 | 1/2014 | Smilovici et al. | |
| 2014/0248098 A1 | 9/2014 | Pacheri | |
| 2014/0334890 A1 | 11/2014 | Takahashi | |
| 2015/0202697 A1* | 7/2015 | Shiota | B23C 5/109 407/42 |
| 2016/0256941 A1* | 9/2016 | Brunetto | B23C 5/06 |
| 2018/0001399 A1* | 1/2018 | Kister | B23C 5/2213 |
| 2019/0015911 A1* | 1/2019 | Hagiwara | B23C 5/202 |
| 2019/0054550 A1* | 2/2019 | Yoshida | B23B 27/14 |
| 2019/0084059 A1* | 3/2019 | Stark | B23C 5/109 |
| 2019/0240740 A1* | 8/2019 | Sakai | B23B 27/145 |
| 2020/0023444 A1* | 1/2020 | Saitoh | B23C 5/202 |

FOREIGN PATENT DOCUMENTS

| | | | |
|---|---|---|---|
| CN | 107598200 A | 1/2018 | |
| CN | 207188816 U | 4/2018 | |
| EP | 1852200 A2 | 11/2007 | |
| JP | H11-019817 A | 1/1999 | |
| JP | 2001-157904 A | 6/2001 | |
| JP | 2013-176834 A | 9/2013 | |
| JP | 2014-083632 A | 5/2014 | |
| JP | 2014-087881 A | 5/2014 | |
| JP | 5983901 B1 | 9/2016 | |
| KR | 10-2015-0030217 A | 3/2015 | |
| WO | 2008/146563 A1 | 12/2008 | |
| WO | 2011/001939 A1 | 1/2011 | |
| WO | WO-2011052340 A1 * | 5/2011 | ............... B23C 5/06 |
| WO | WO-2012043579 A1 * | 4/2012 | ............ B23B 27/007 |
| WO | WO-2012147924 A1 * | 11/2012 | ............... B23C 5/06 |

OTHER PUBLICATIONS

Office Action dated Feb. 15, 2023, issued for CN201980037682.4 and English translation of the Search Report.
Supplementary European Search Report dated Feb. 23, 2022, issued for European Patent Application No. 19814222.6.
Notice of Allowance dated Mar. 10, 2022, issued for Korean Patent Application No. 10-2020-7036147 and English translation thereof.
Notice of Allowance dated Nov. 2, 2021, issued for Japanese Patent Application No. 2020-523560 and English translaion thereof.
Notice of Allowance dated Jul. 11, 2023, issued for CN201980037682.4 and English translation of the Search Report.

* cited by examiner

CUTTING INSERT AND CUTTING EDGE REPLACEMENT TYPE CUTTING TOOL

TECHNICAL FIELD

The present invention relates to a cutting insert that is detachably mounted on an indexable cutting tool such as an indexable end mill, and an indexable cutting tool on which such a cutting insert is detachably mounted.

Priority is claimed on Japanese Patent Application No. 2018-110398, filed Jun. 8, 2018, the content of which is incorporated herein by reference.

BACKGROUND ART

For example, Patent Document 1 discloses, as a cutting insert and an indexable cutting tool, a cutting insert having a triangular plate shape in which an insert main body has two triangular surfaces each having a substantially triangular shape with three corners, and an indexable cutting tool in which the cutting insert is detachably mounted on an insert mounting seat by a clamp screw which is inserted into a mounting hole formed to penetrate the insert main body, wherein one triangular surface of the cutting insert is caused to serve as a rake face and to face in a tool rotation direction, a corner edge formed at one corner of the one triangular surface is caused to face an outer periphery side of a tool main body, a major cutting edge extending from a first end of the one corner edge is caused to face a tip end outer periphery side of the tool main body, and a minor cutting edge (a wiper edge) extending from a first end of the major cutting edge is located substantially on a plane perpendicular to a rotational axis of the tool main body.

In such a cutting insert, due to the major cutting edge that faces a tip end side of the tool main body and goes toward a posterior end side at a gentle angle with respect to the plane perpendicular to the rotational axis as it goes toward the outer periphery side of the tool main body, a thin chip is generated in the major cutting edge on an inner periphery side of the tool main body or in the above-described wiper edge, and thus it is possible to suppress an increase in cutting resistance even if the tool main body is fed at a high feed amount. Therefore, an efficient cutting operation can be performed in the processing of a mold or the like. Further, Patent Document 1 discloses that in a case in which a cutting amount in a Z-axis direction is set to be large in inclination cutting operation, a second minor cutting edge connected to a first minor cutting edge also acts as a cutting edge.

CITATION LIST

Patent Literature

[Patent Document 1]
Japanese Patent No. 5983901

SUMMARY OF INVENTION

Technical Problem

Meanwhile, in high feeding processing or a high cutting operation by the indexable cutting tool on which such a cutting insert mounted, it is required to secure a good chip discharging property. Particularly, in a case in which the inclination cutting operation such as engraving a pocket on a work material such as a mold as described in Patent Document 1 is performed, if the outflow direction of the chip is not controlled, the chip is easily caught between the minor cutting edge (the second minor cutting edge) extending from the second end of the one corner edge facing the tip end side of the tool main body toward the posterior end side of the tool main body and an inner wall surface of the pocket as a depth of the pocket increases, and a fracture may be generated in the minor cutting edge, which may make it impossible to rotate the insert main body around the mounting hole and to remount it for use.

Here, it is known that in such a cutting insert, a chip breaker having a protrusion shape or the like is formed on the rake face, and the chip is brought into sliding contact with the chip breaker, and thus resistance is given to the chip and the outflow direction of the chip is controlled. However, as described in Patent Document 1, the insert main body has two triangular surfaces and is formed in a front-back inversion symmetrical shape, and after the cutting edge of one triangular surface is used, the insert main body is front-back inverted and remounted. Therefore, in a double-sided cutting insert that is configured to use the cutting edge of the other triangular surface, if the chip breaker is formed on the rake face unnecessarily, an area of close attachment between a boss surface of the insert main body which is a plane perpendicular to an insert center line passing through a center of the mounting hole and a bottom surface of the insert mounting seat of the tool main body which faces in the tool rotational direction becomes small in general, which may impair mounting stability of the cutting insert.

The present invention has been made in view of these circumstances, and an object of the present invention is to provide a cutting insert in which a fracture of a cutting edge due to a chip being caught can be prevented without impairing mounting stability of the cutting insert even if high feeding processing, a high cutting operation, or an engraving operation of a pocket is performed, and an indexable cutting tool on which such a cutting insert is detachably mounted.

Solution to Problem

To solve the above-described problems and achieve such an object, a cutting insert of the present invention includes: a polygonal plate-shaped insert main body that includes: two polygonal surfaces which have a polygonal shape and of which one serves as a rake face and the other serves as a seating surface; a side surface which is arranged around the two polygonal surfaces and in which a flank face intersecting with the rake face of the polygonal surfaces is formed; and a cutting edge which is formed on an intersecting ridgeline between the rake face and the flank face, wherein the insert main body has a mounting hole that penetrates the insert main body centered on an insert center line passing through centers of the two polygonal surfaces, has a rotationally symmetrical shape with respect to the insert center line, and has a front-back inversion symmetrical shape with respect to the two polygonal surfaces, wherein the cutting edge includes at least a corner edge located at a corner of the polygonal surface and a major cutting edge extending from a first end of the corner edge, and wherein, in an opening of the mounting hole in the two polygonal surfaces, a plurality of protrusions protruding with respect to a boss surface formed on the polygonal surface around the opening of the mounting hole are formed at intervals in a peripheral direction in an inner periphery side region of the major cutting edge.

An indexable cutting tool of the present invention is an indexable cutting tool in which the cutting insert configured in this manner is detachably mounted on an insert mounting seat formed on an outer periphery of a tip end portion of a tool main body which is rotated around an axis in such a manner that a clamp screw which is inserted into the mounting hole is screwed into a screw hole formed in a bottom surface of the insert mounting seat which faces in a tool rotation direction, wherein, in the insert main body, one polygonal surface of the two polygonal surfaces is caused to serve as a rake face and to face in the tool rotation direction, and the boss surface of the other polygonal surface is closely attached to the bottom surface of the insert mounting seat, wherein the insert main body is mounted in such a manner that the one corner edge of the one polygonal surface faces an outer periphery side of the tool main body and the one major cutting edge extending from a first end of the one corner edge is caused to face a tip end side of the tool main body, and wherein accommodation recesses for accommodating the protrusions of the other polygonal surface are formed around an opening of the screw hole in the bottom surface of the insert mounting seat.

In the cutting insert and the indexable cutting tool having the above-described configuration, the plurality of protrusions protruding with respect to the boss surface formed on the polygonal surface around the opening of the mounting hole are formed on the opening of the mounting hole in the two polygonal surfaces of the insert main body at intervals in the peripheral direction in the inner periphery side region of the major cutting edge, and thus the protrusions act as chip breakers and the outflow direction can be controlled. In particular, since the protrusions are formed at intervals in the peripheral direction, the chip brought into sliding contact with the protrusions can be guided to a portion between the protrusions, and the outflow direction of the chip can be controlled.

Meanwhile, since the protrusions are formed at intervals in the peripheral direction in this manner, the boss surface can be closely attached to the bottom surface of the insert mounting seat of the tool main body up to a space between the protrusions in the opening of the mounting hole and mounting stability of the cutting insert can be secured. Moreover, since the protrusions are formed in the opening of the mounting hole on the innermost periphery side of the boss surface, the area of close attachment to the bottom surface of the insert mounting seat in the outer peripheral portion of the boss surface does not become small, and thus it is possible to more reliably stabilize the mounting of the cutting insert.

Preferably, in the protrusions, furthest protruding portions which protrude furthest from the boss surface extend with a predetermined length around the opening of the mounting hole. Since the furthest protruding portions of the protrusions which protrude furthest from the boss surface extend around the opening of the mounting hole with a predetermined length, it is possible to reliably bring the chip into sliding contact with the protrusions and to control the outflow direction, and it is possible to prevent wear of the protrusions due to sliding contact of the chip.

Preferably, in a case in which the furthest protruding portions extend with a predetermined length, for example, the length of each furthest protruding portion in the peripheral direction of the opening portion of the mounting hole is in a range of 5% to 8% with respect to a periphery length of the entire periphery of the opening of the mounting hole.

To control the outflow direction of the chip, the furthest protruding portions preferably extend at a predetermined protruding height, but in some cases, wavy protrusions having a plurality of protruding ends in which the furthest protruding portions and portions slightly lower than the furthest protruding portions are continuous in the peripheral direction is possible.

Preferably, in the protrusions, when seen in a direction facing the polygonal surface, furthest protruding portions which protrude furthest from the boss surface are similarly located between a straight line connecting the first end of the corner edge and the insert center line to each other and a straight line connecting a first end of the major cutting edge on a side opposite to the first end of the corner edge and the insert center line to each other. Accordingly, it is also possible to reliably bring the chip that is generated by the major cutting edge and flows out to the inner periphery side of the rake face during high feeding processing or a high cutting operation into sliding contact with the protrusions and to control the outflow direction, and it is possible to prevent the chip from coming into sliding contact with the clamp screw and to prevent wear of the clamp screw.

Preferably, in a case in which the insert main body has a triangular plate shape in which each of the two polygonal surfaces has three corners, when seen in the direction facing the polygonal surface, the furthest protruding portions are located in an angle range of 15° to 40° centered on the insert center line from the straight line connecting the first end of the major cutting edge on the side opposite to the first end of the corner edge and the insert center line to each other toward the corner edge side. In a case in which the insert main body is mounted on the tool main body of the indexable cutting tool, such an angle range is a portion which is located on the inner periphery side of the tool main body in the major cutting edge and at which a thin chip is generated, and the furthest protruding portions of the protrusions are disposed in the inner periphery side region of the major cutting edge in such a portion, and thus the outflow direction of the entire chip can be effectively controlled and the cutting resistance can be further reduced. Further, it is possible to reliably prevent wear of the protrusions due to the thick chip.

Preferably, in a case in which the cutting edge further includes a minor cutting edge extending from the second end of the corner edge toward the other cutting edge adjacent to the second end side of the corner edge, the minor cutting edge is formed to extend to a region of the boss surface at least on a side opposite to the corner edge, and in a portion extending to the region of the boss surface, the minor cutting edge is formed on an intersecting ridgeline between an inclined face that goes toward the polygonal surface side opposite to the subject polygonal surface as it goes toward an outer periphery side of the subject polygonal surface and the flank face.

Therefore, at the portion which extends to the region of the boss surface, it is possible to secure a large edge angle of the minor cutting edge and to improve a cutting edge strength. Thus, in a case in which the engraving operation of the pocket is performed on the work material such as a mold, for example, in a state in which the outflow direction of the chip is not sufficiently controlled, even if the chip flows from the one corner edge toward the minor cutting edge side extending to the posterior end side of the tool main body and is caught between the inner wall surface of the pocket and the minor cutting edge, it is possible to prevent a fracture from being generated in the minor cutting edge.

In this case, in the outer peripheral portion of the polygonal surface, the protruding ridge portion that protrudes with respect to the boss surface is formed along the minor cutting edge of a portion extending to the region of the boss surface, and the inclined face is formed on an outer peripheral surface of the protruding ridge portion facing the outer periphery side of the polygonal surface. Therefore, even if the chip flows toward the minor cutting edge side in a case of the engraving operation as described above, before the chip is caught between the minor cutting edge and the inner wall surface of the pocket, the chip comes into sliding contact with an inner peripheral surface of the protruding ridge portion that protrudes from the boss surface, which faces the inner periphery side and receives resistance, and thus the chip is curled. Therefore, it is possible to prevent the chip from being caught. Here, the inclined face may be formed in a chamfered shape that faces the opposite polygonal surface side as it goes from the boss surface toward the outer periphery side of the polygonal surface.

Meanwhile, in a case in which the boss surface is a plane perpendicular to the insert center line as described above, an inclined portion that is inclined to protrude in a direction of the insert center line as it goes from the boss surface toward the cutting edge side is formed on the polygonal surface. Therefore, it is possible to increase a rake angle of the cutting edge which is formed on the intersecting ridgeline between the inclined portion and the flank face to a regular angle side to ensure sharp cutting quality, and thus it is possible to reduce the cutting resistance at the time of the high feeding processing or the high cutting operation.

Further, in a case in which the inclined portion is formed in this manner, in a cross section orthogonal to the major cutting edge, the inclined portion has a first steeply inclined portion that protrudes in the direction of the insert center line as it goes from the boss surface toward the major cutting edge side, a gently inclined portion that is continuous with the first steeply inclined portion on the major cutting edge side and protrudes in the direction of the insert center line at a gradient gentler than the first steeply inclined portion as it goes toward the major cutting edge side, and a second steeply inclined portion that is continuous with the gently inclined portion on the major cutting edge side and protrudes in the direction of the insert center line at a gradient steeper than the gently inclined portion as it goes toward the major cutting edge side. Therefore, when the chip flows from the second steeply inclined portion to the gently inclined portion, or when the chip flows from the gently inclined portion to the first steeply inclined portion, it is possible to give resistance to the chip, and particularly it is possible to improve a processing property of the chip at the time of the high feeding processing.

Advantageous Effects of Invention

As described above, according to the present invention, the fracture of the cutting edge due to the chip being caught can be prevented without impairing the mounting stability of the cutting insert on the insert mounting seat even if the high feeding processing, the high cutting operation, or the engraving operation of the pocket is performed, and stable cutting can be performed over a long period of time.

DESCRIPTION OF EMBODIMENTS

FIGS. 1 to 8 show a first embodiment of a cutting insert of the present invention, FIGS. 9 to 16 show a tool main body in an embodiment of an indexable cutting tool of the present invention on which the cutting insert of the embodiment is to be detachably mounted, and FIGS. 17 to 24 show the embodiment of the indexable cutting tool of the present invention in which the cutting insert of the embodiment has been detachably mounted on the tool main body.

Figure 2:
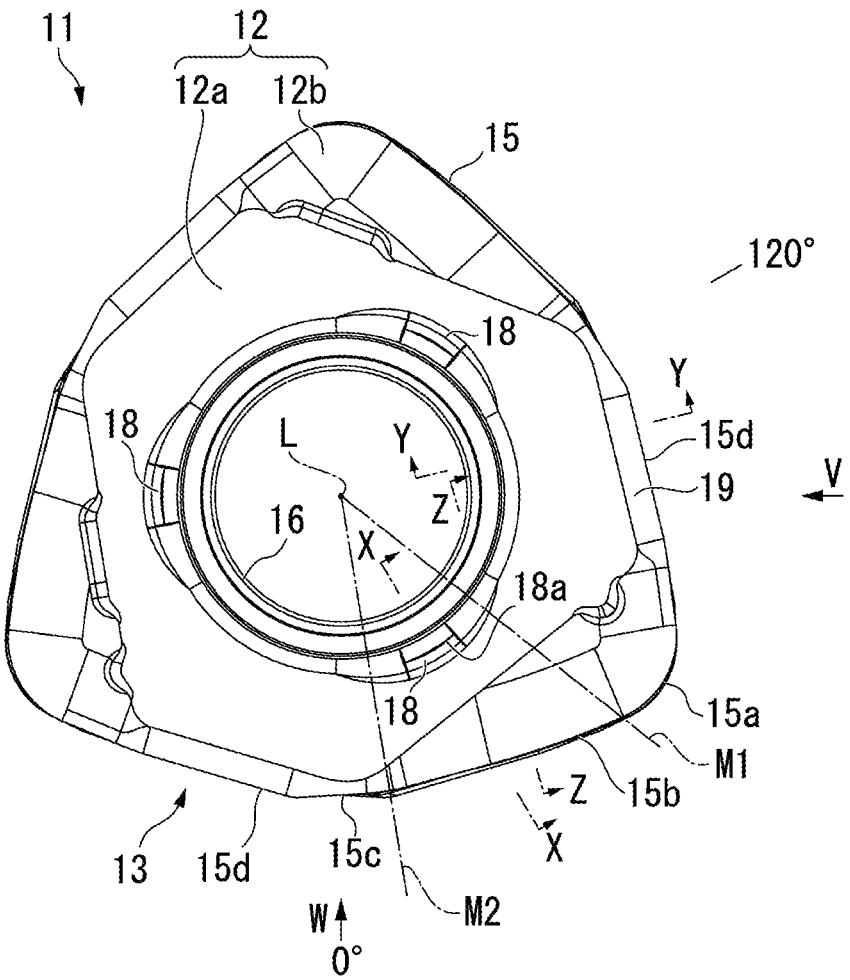
FIG. 2 is a plan view of the embodiment shown in FIG. 1 in a direction of an insert center line.
Figure 3:
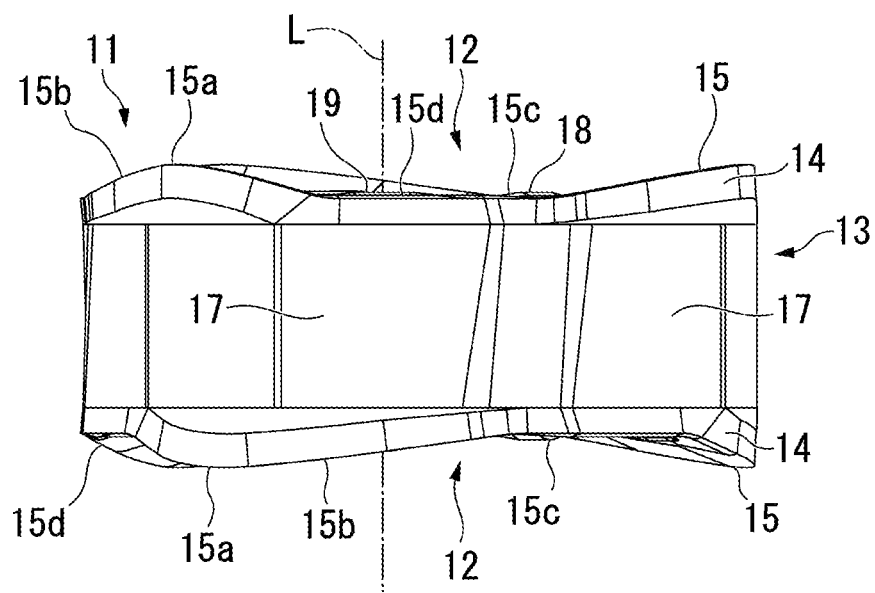
FIG. 3 is a side view in a direction of arrow V in FIG. 2.
Figure 4:
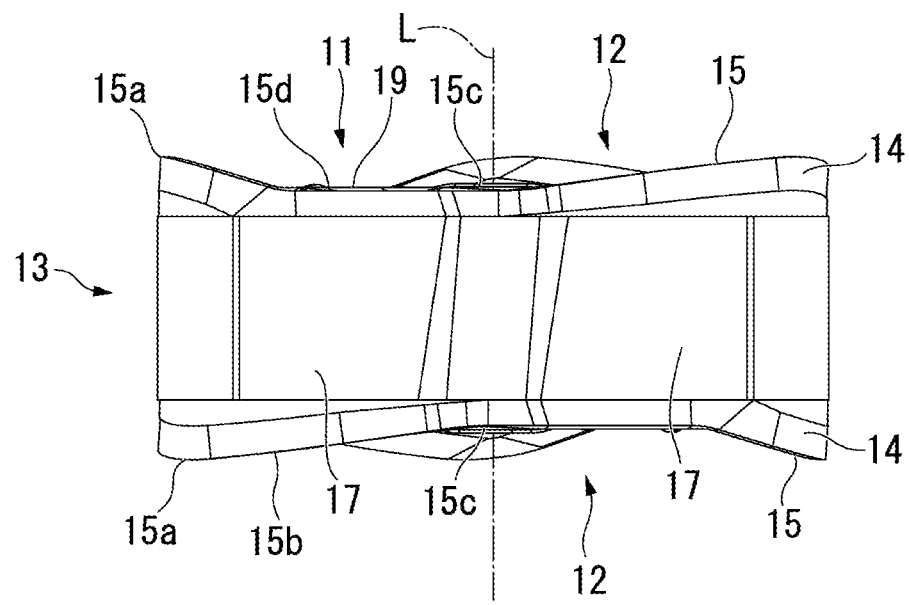
FIG. 4 is a side view in a direction of arrow W in FIG. 2.

The cutting insert of the present embodiment includes a polygonal plate-shaped insert main body 11 formed of a hard material such as cemented carbide, and the insert main body 11 has a triangular plate shape in which each of two polygonal surfaces 12 has three corners as shown in FIG. 2, has a rotationally symmetrical shape with respect to an insert center line L passing through centers of the two polygonal surfaces 12 when seen in a direction facing the polygonal surfaces 12, and has a front-back inversion symmetrical shape with respect to the two polygonal surfaces 12.

Figure 17:
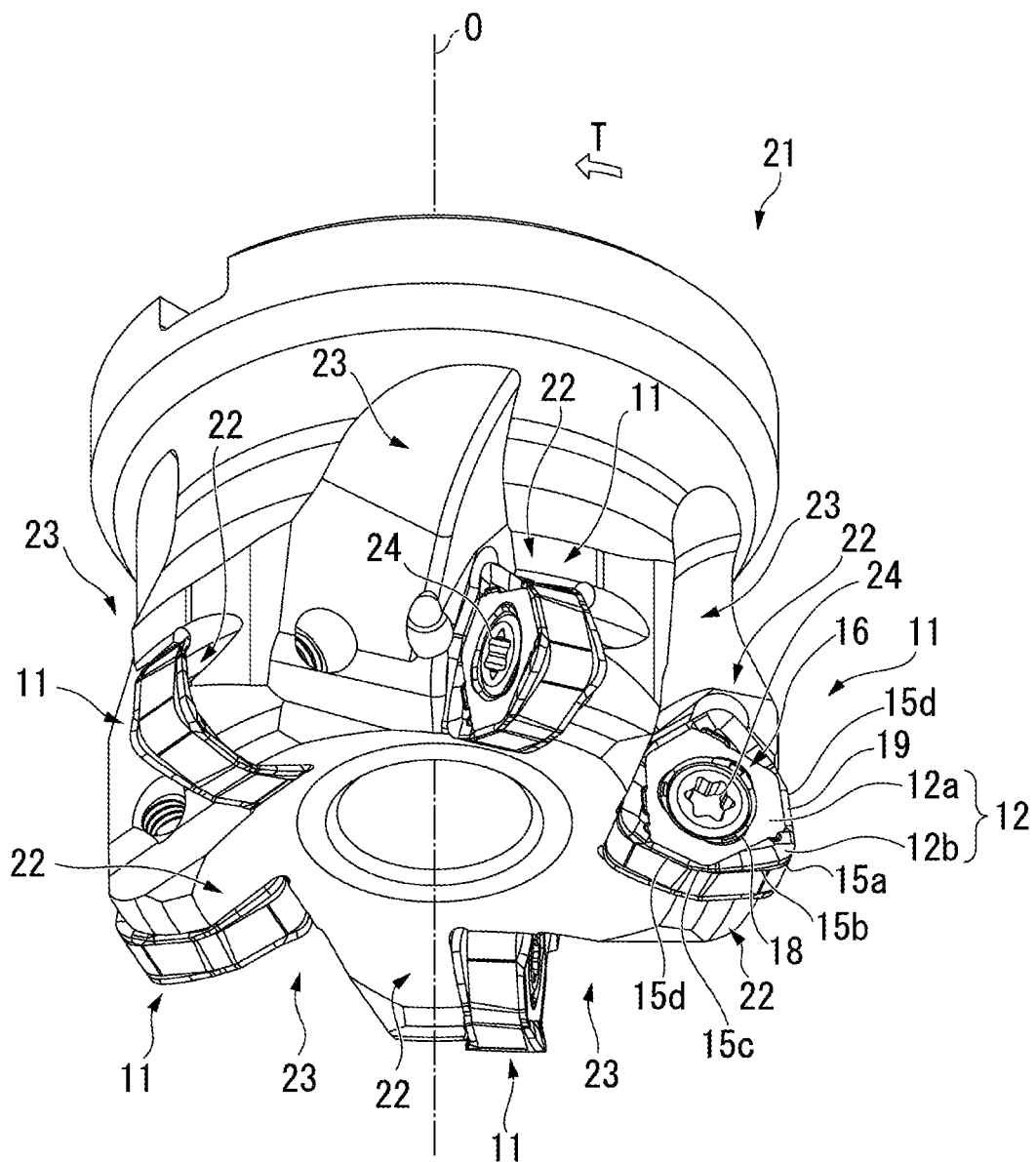
FIG. 17 is a perspective view showing the embodiment of the indexable cutting tool of the present invention in which the cutting insert of the embodiment shown in FIG. 1 has been detachably mounted on the tool main body shown in FIG. 9.
Figure 18:
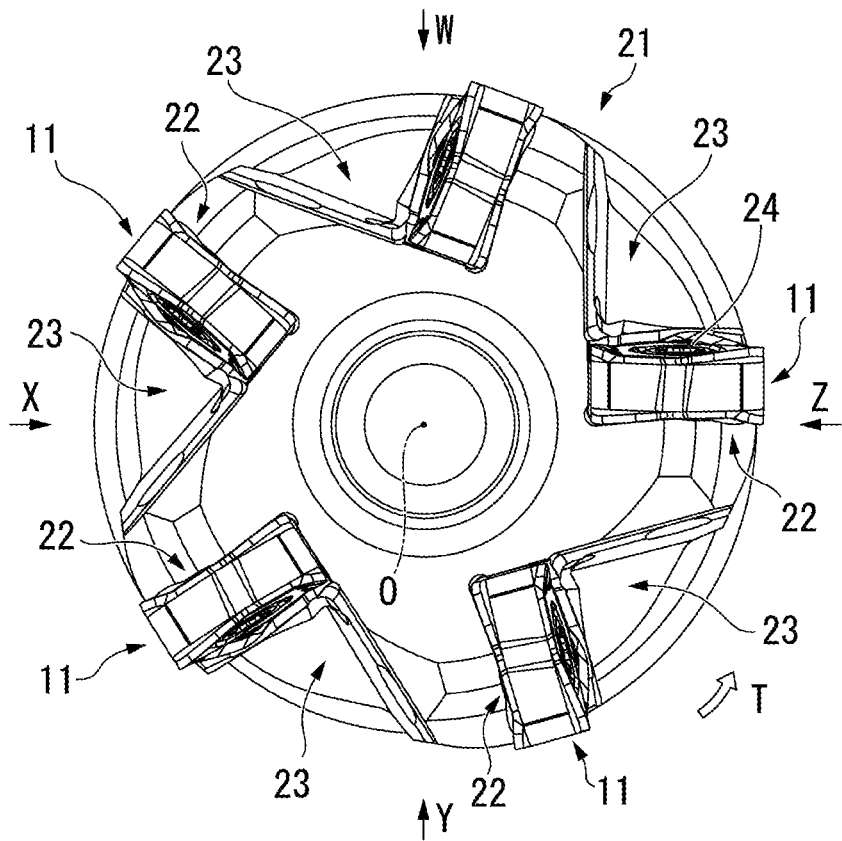
FIG. 18 is a bottom view of the indexable cutting tool shown in FIG. 17.
Figure 19:
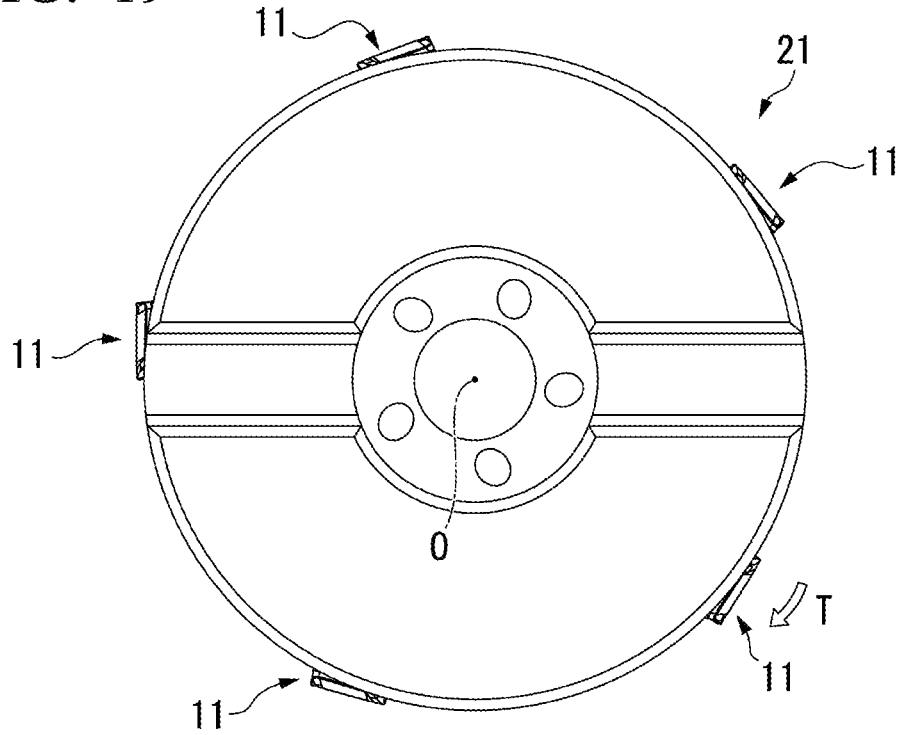
FIG. 19 is a plan view of the indexable cutting tool shown in FIG. 17.
Figure 20:
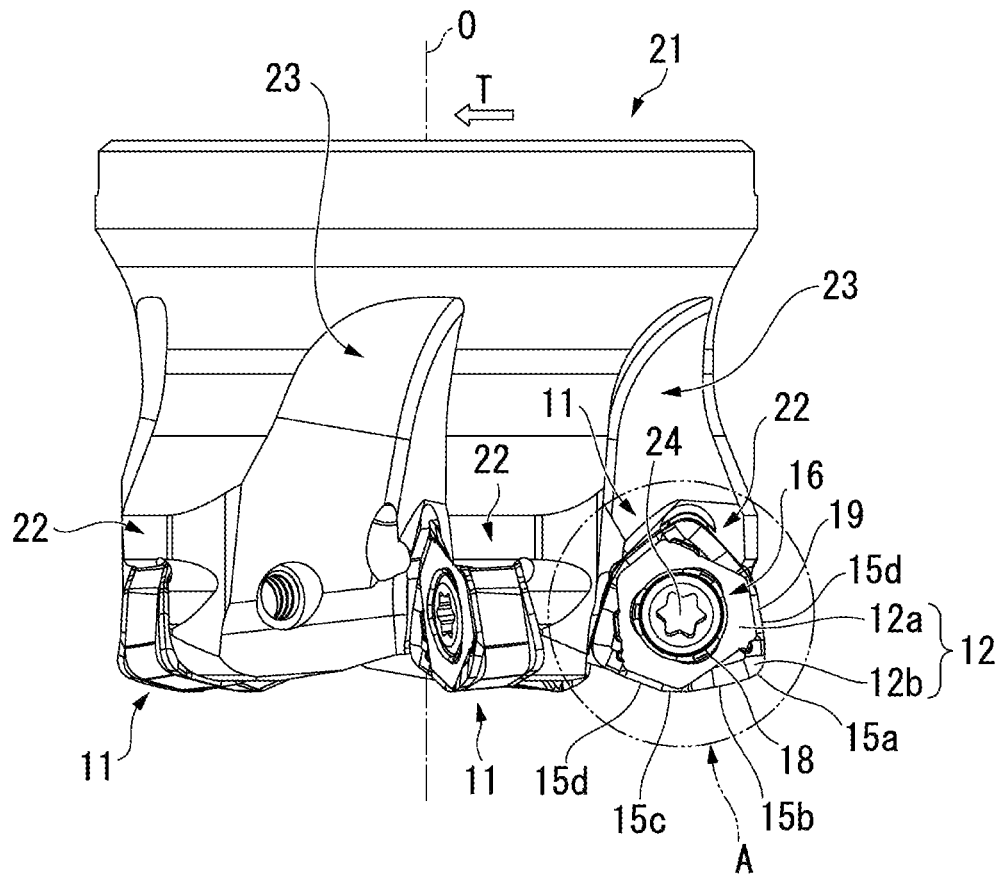
FIG. 20 is a side view in a direction of arrow W in FIG. 18.
Figure 21:
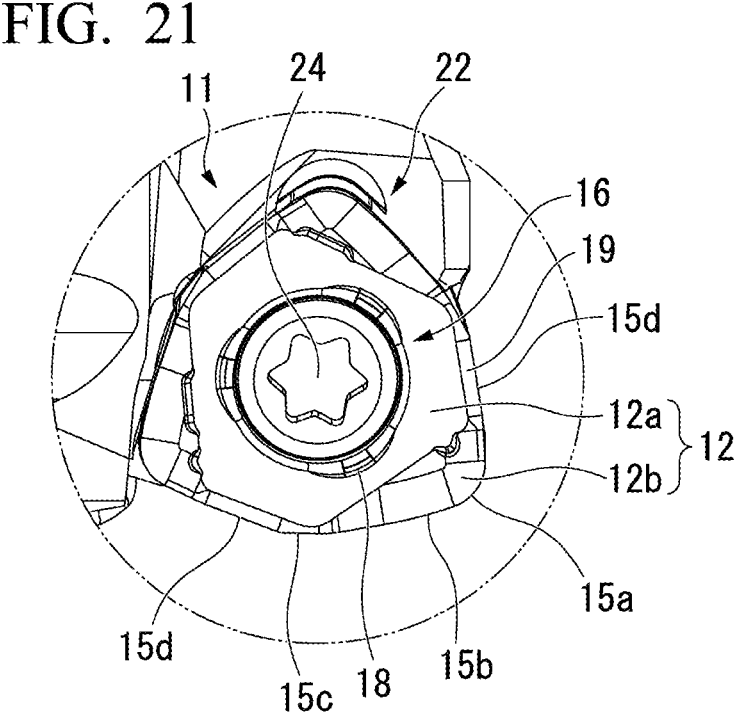
FIG. 21 is an enlarged view of a portion A in FIG. 20.
Figure 22:
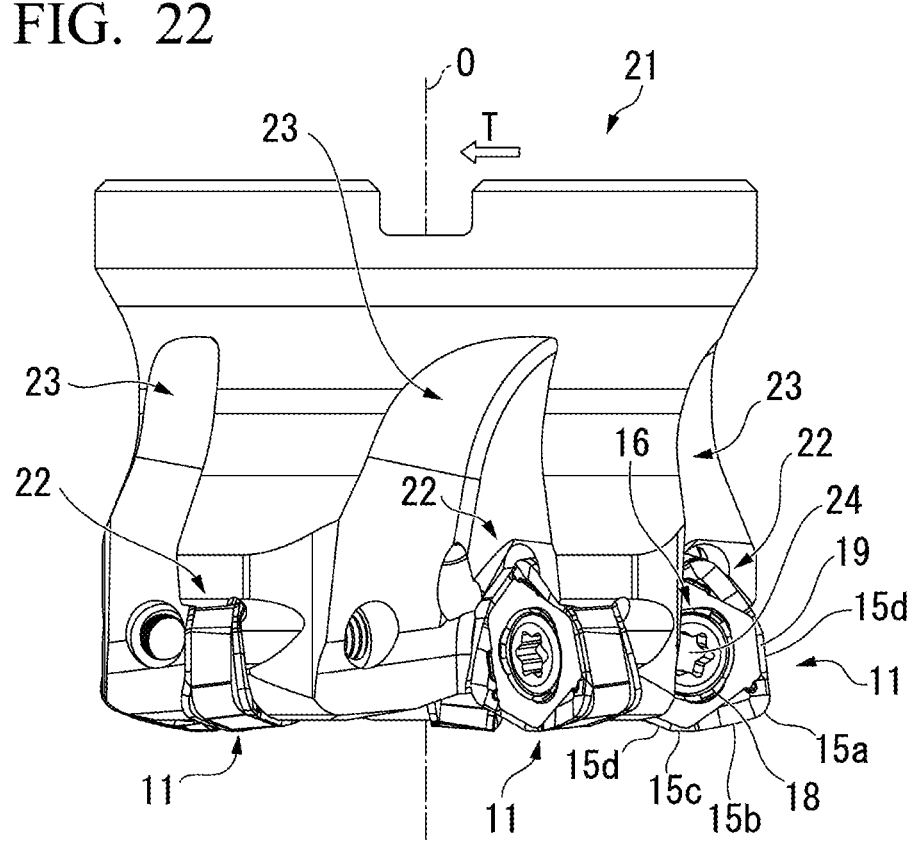
FIG. 22 is a side view in a direction of arrow X in FIG. 18.
Figure 23:
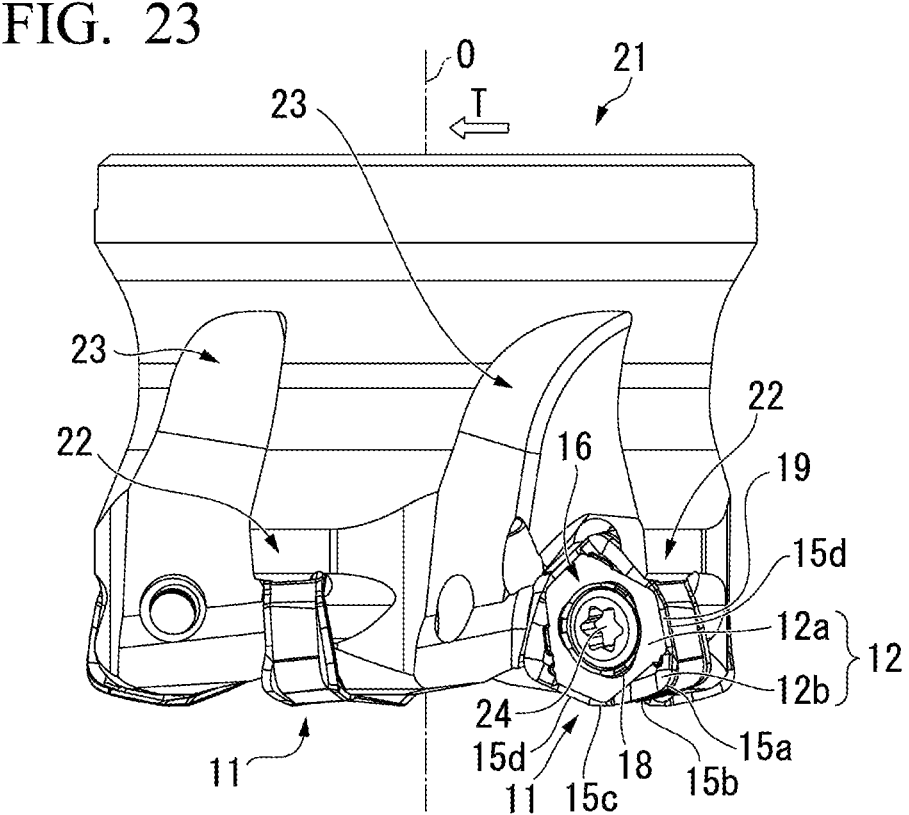
FIG. 23 is a side view in a direction of arrow Y in FIG. 18.
Figure 24:
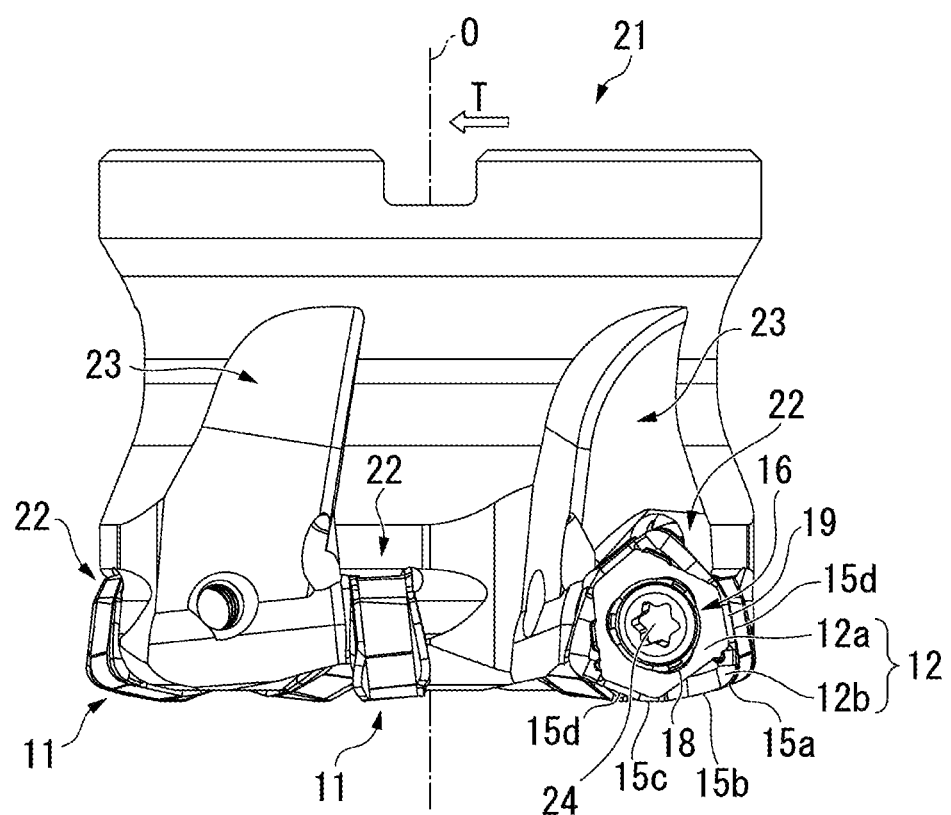
FIG. 24 is a side view in a direction of arrow Z in FIG. 18.
Figure 25:
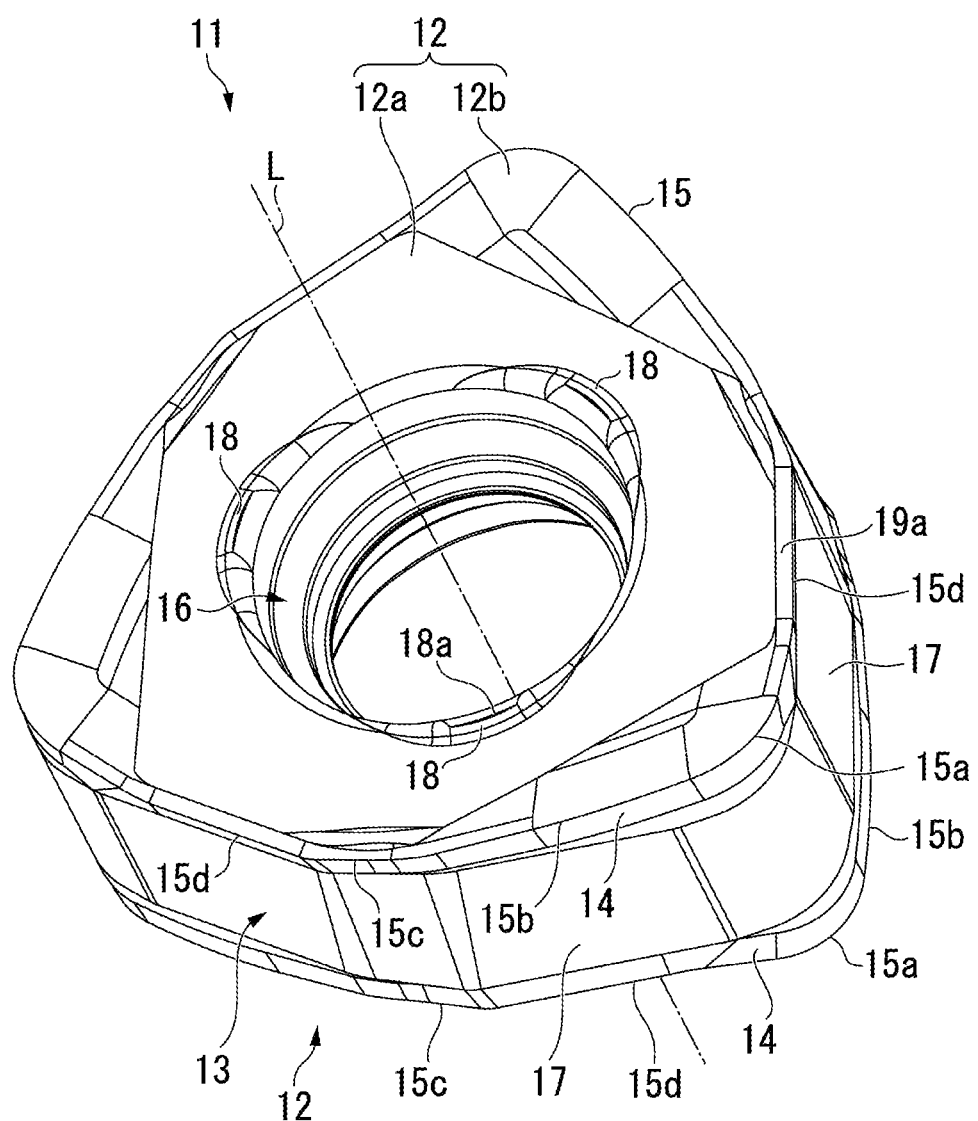
FIG. 25 is a perspective view showing a second embodiment of a cutting insert of the present invention.
Figure 26:
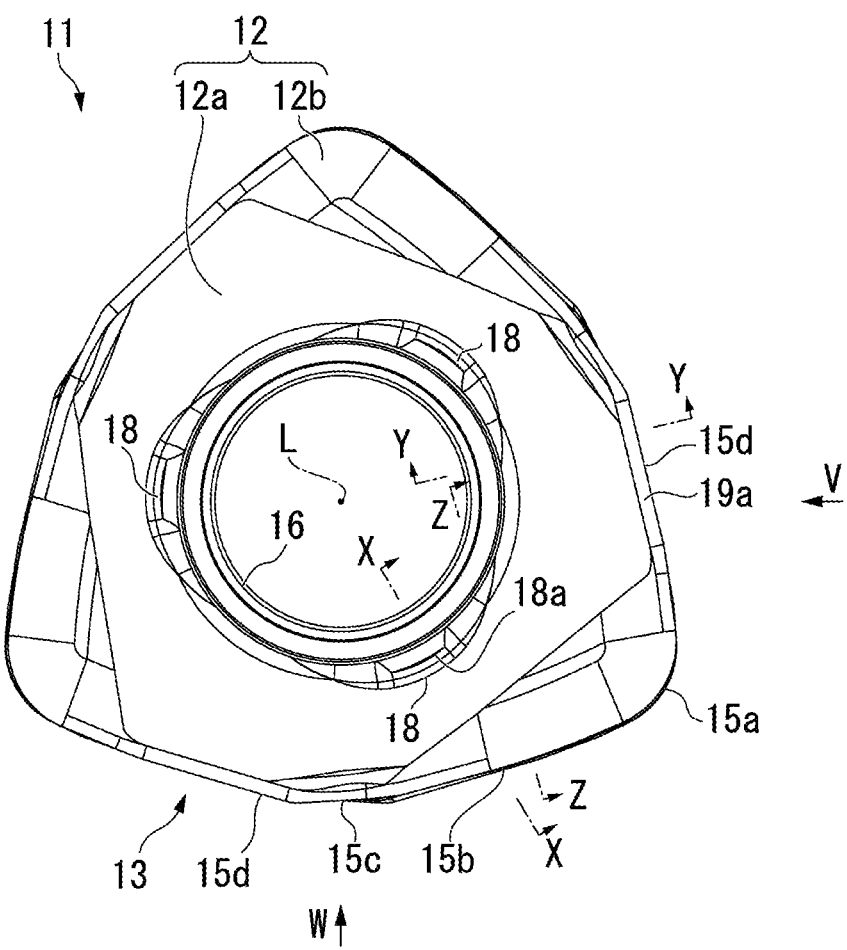
FIG. 26 is a plan view of the embodiment shown in FIG. 25 in a direction of an insert center line.
Figure 27:
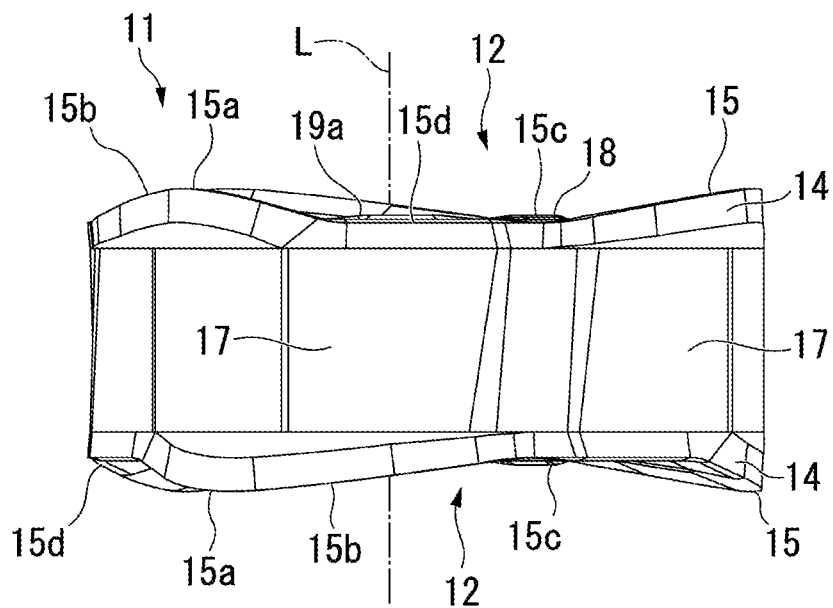
FIG. 27 is a side view in a direction of arrow V in FIG. 26.
Figure 28:
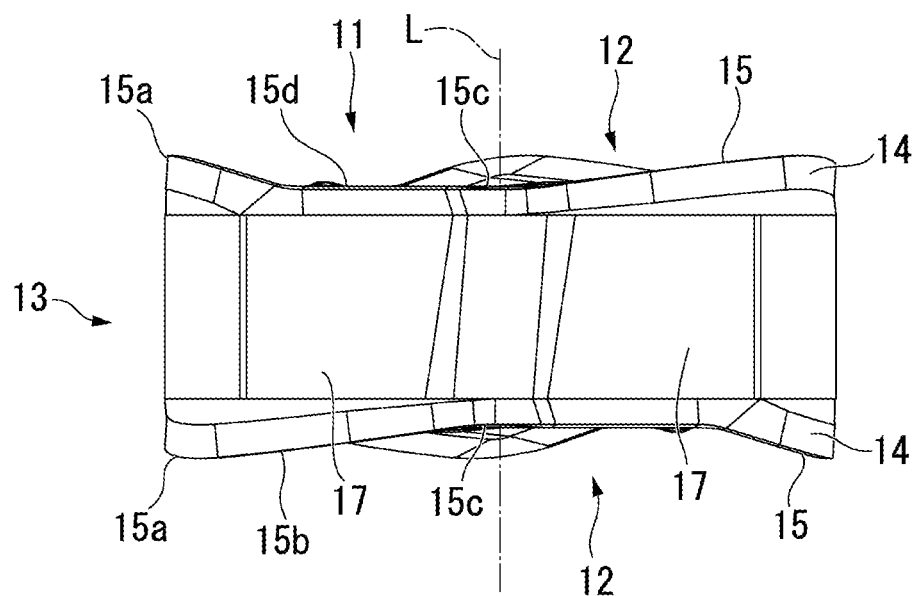
FIG. 28 is a side view in a direction of arrow W in FIG. 26.
Figure 29:
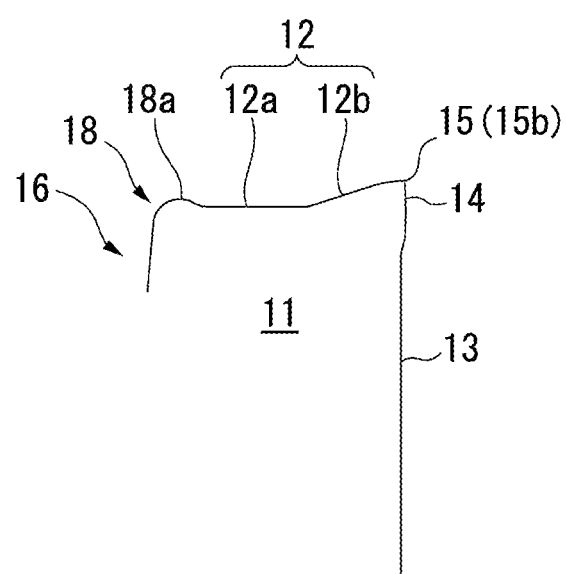
FIG. 29 is a sectional view along line XX in FIG. 26.
Figure 30:
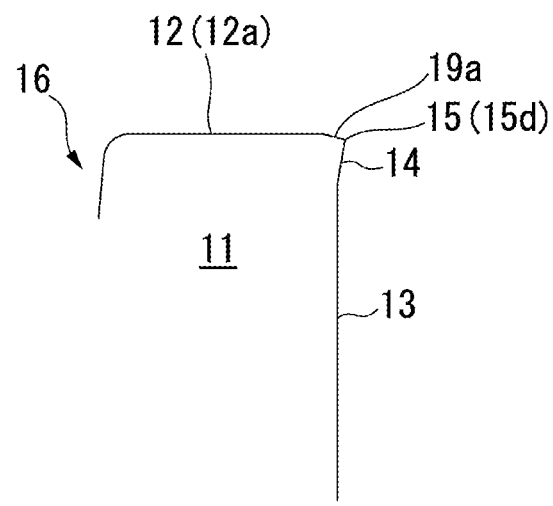
FIG. 30 is a sectional view along line YY in FIG. 26.
Figure 31:
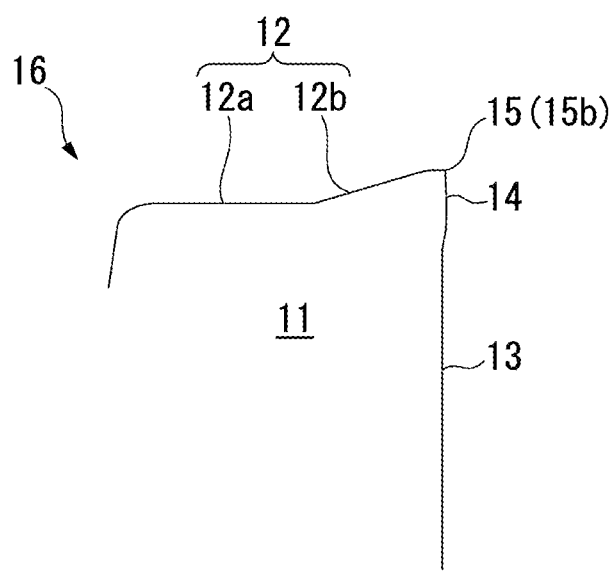
FIG. 31 is a sectional view along line ZZ in FIG. 26.
Figure 32:
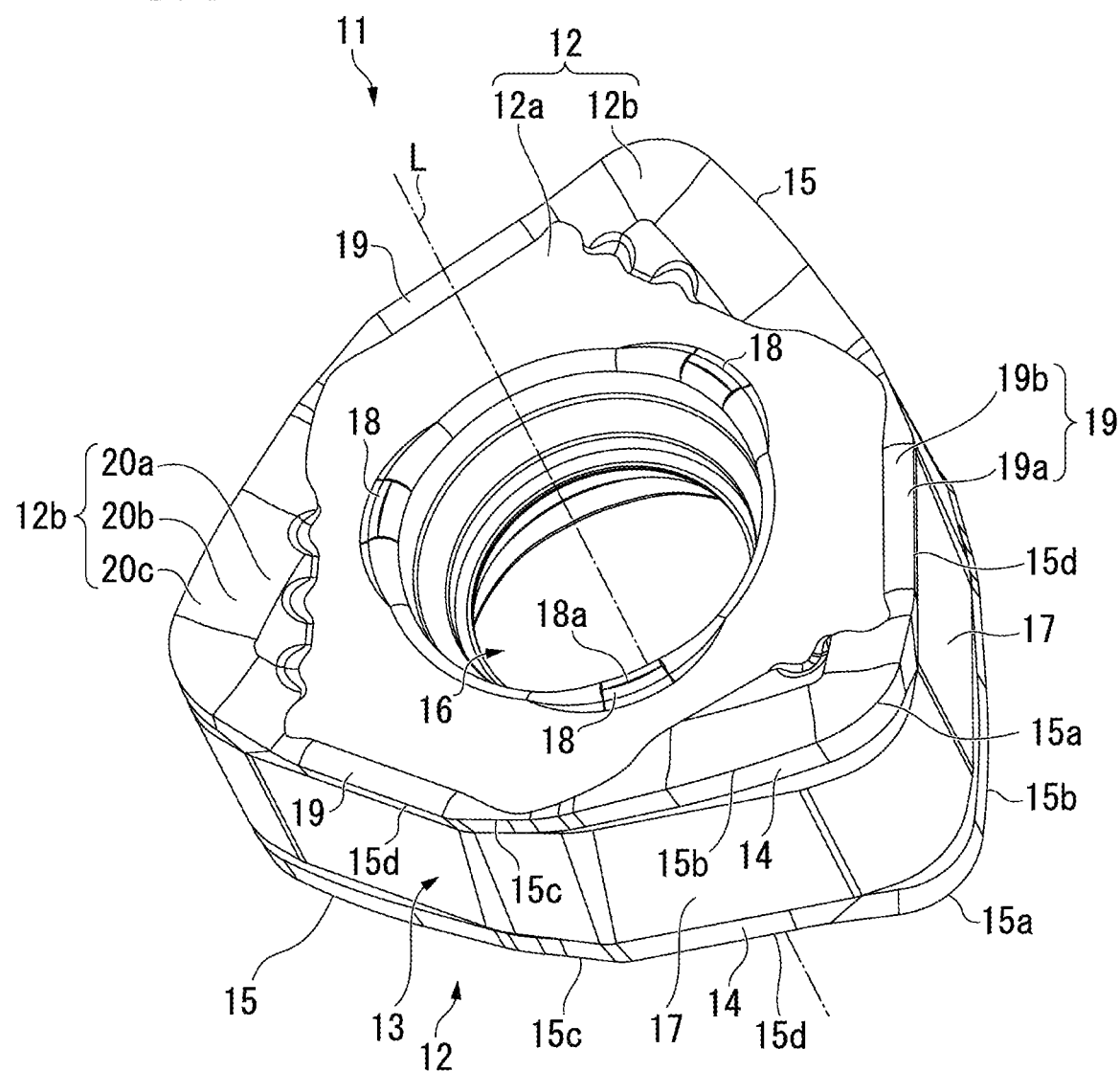
FIG. 32 is a perspective view showing a third embodiment of a cutting insert of the present invention.
Figure 33:
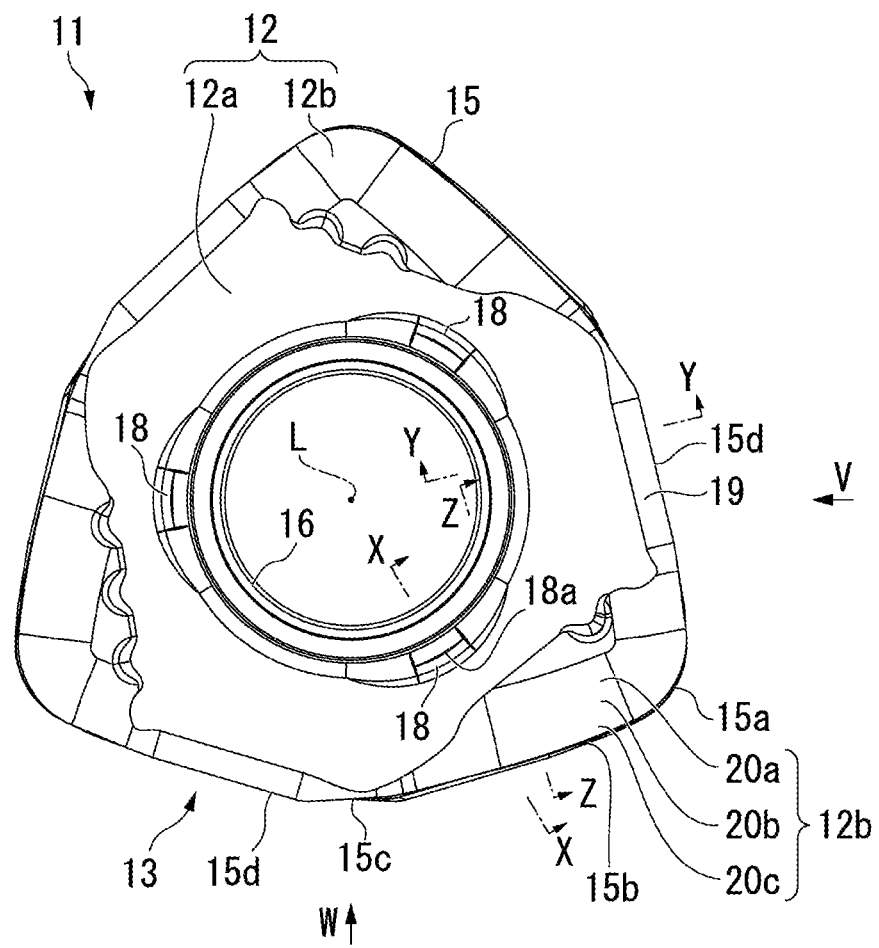
FIG. 33 is a plan view of the embodiment shown in FIG. 32 in a direction of an insert center line.
Figure 34:
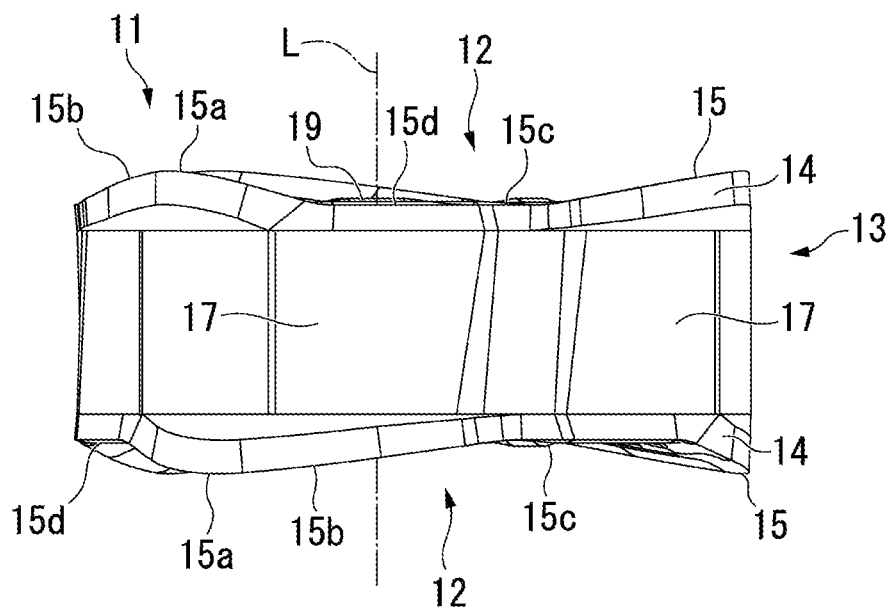
FIG. 34 is a side view in a direction of arrow V in FIG. 33.
Figure 35:
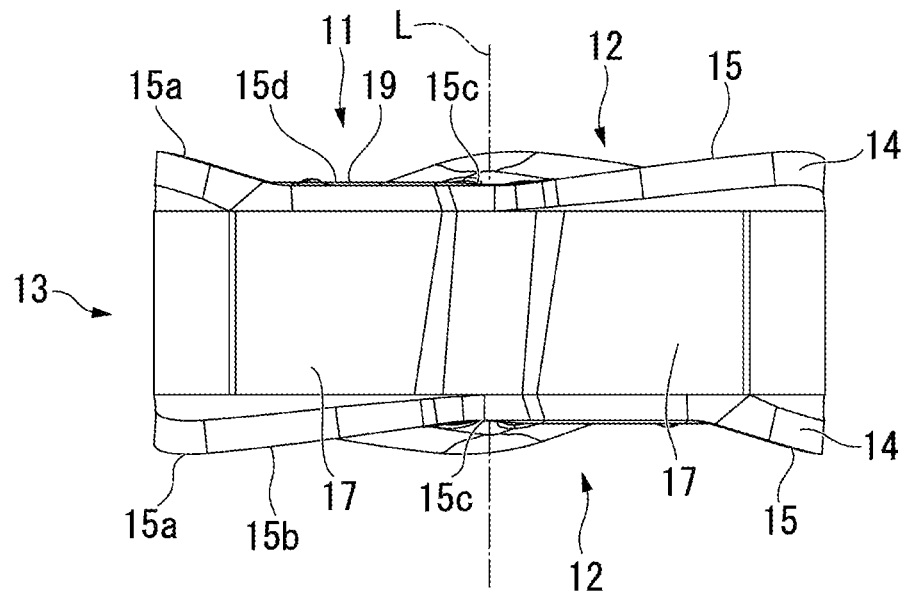
FIG. 35 is a side view in a direction of arrow W in FIG. 33.
Figure 36:
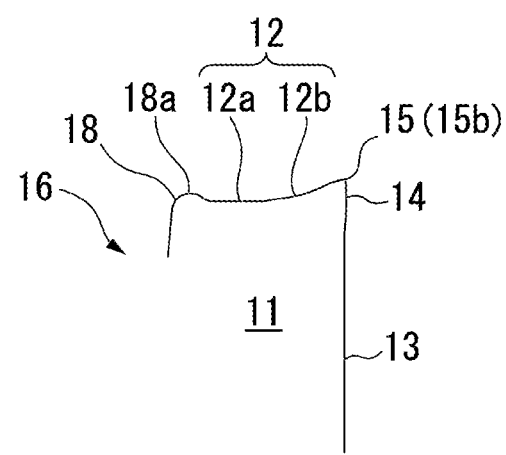
FIG. 36 is a sectional view along line XX in FIG. 33.
Figure 37:
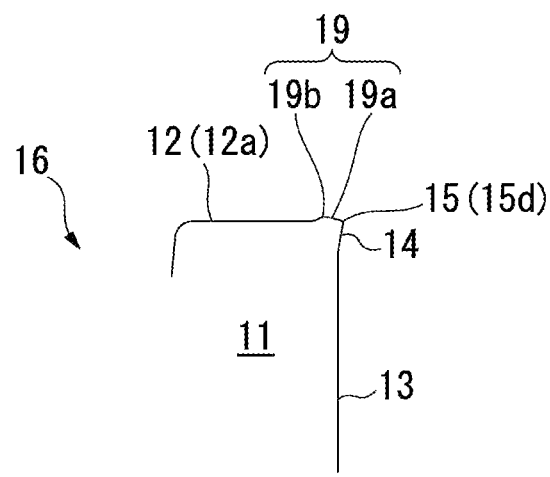
FIG. 37 is a sectional view along line YY in FIG. 33.

When the two polygonal surfaces 12 are mounted on the tool main body 21 of the indexable cutting tool as shown in FIG. 17, one of the polygonal surfaces 12 serves as a rake face and the other of the polygonal surfaces 12 serves as a seating surface for an insert mounting seat 22 formed on the tool main body 21. A flank face 14 that intersects with the rake surface of the two polygonal surfaces 12 is formed on a side surface 13 of the insert main body 11 arranged around the two polygonal surfaces 12, and a cutting edge 15 is formed on an intersecting ridgeline between the rake face (the polygonal surface 12) and the flank face 14. In addition, a mounting hole 16 which is for mounting the insert main body 11 on the insert mounting seat 22 and which has a circular cross section centered on the insert center line L is provided in centers of the two polygonal surfaces 12 such that the mounting hole penetrates the insert main body 11 in a direction of the insert center line L to open.

When seen in the direction of the insert center line L, the cutting edge 15 includes a corner edge 15a which is disposed at three corners of the polygonal surface 12 and which has a convex curved shape such as an arc, a major cutting edge 15b which extends from a first end (an end portion on a side in a clockwise direction centered on the insert center line L in FIG. 2) of the corner edge 15a in contact with the corner edge 15a and which has a straight line shape or a convex curve shape of which a radius of curvature is larger than that of a convex curve formed by the corner edge 15a, and a wiper edge 15c which extends in a direction intersecting with the major cutting edge 15b at an obtuse angle in a first end of the major cutting edge 15b and which has a straight line shape or a convex curve shape of which a radius of curvature is larger than that of a convex curve formed by the major cutting edge 15b.

The cutting edge 15 further includes a minor cutting edge 15d which extends from the second end of the corner edge 15a in contact with the corner edge 15a and which has a straight line shape when seen in the direction of the insert center line L. The minor cutting edge 15d extends in a direction intersecting with the wiper edge 15c of the other of the cutting edges 15 adjacent to the second end side (a side in a counterclockwise direction centered on the insert center line L in FIG. 2) of the one cutting edge 15 at an obtuse angle.

In boundaries between the corner edge 15a, the major cutting edge 15b, the wiper edge 15c, and the minor cutting edge 15d, a boundary point between the cutting edges in a case in which two curves having different radii of curvature are connected to each other is set as a center point when the radius of curvature changes by 10% or more. With the insert center line L as a reference, the radii of curvature at this time are obtained by measuring positions where a straight line orthogonal to the insert center line intersects with the cutting edge at intervals of 1 to 5 degrees. In a case in which a curve and a straight line are connected to each other, the boundary point between the cutting edges is set as a contact point between the curve and the straight line. The straight line at this time is a tangent to the curve. In a case in which two straight lines are connected to each other, the boundary point between the cutting edges is set as an intersection point between the two straight lines.

The flank face 14 is formed on each of edges of the side surface 13 of the insert main body 11 on the side of the two polygonal surfaces 12, and in a cross section along the insert center line L, a plurality of insert constraining surfaces 17 extending in the direction of the center line L are formed between the flank faces 14 in directions intersecting with each other when seen in the direction of the insert center line L. In the present embodiment, the insert constraining surfaces 17 are flat surfaces parallel to the insert center line L and are formed inside the major cutting edge 15b and the minor cutting edge 15d in the direction of the insert center line L. Between the insert constraining surfaces 17 that are adjacent to each other, a portion which is located on the inside of the corner edge 15a in the direction of the insert center line L is connected as a convex curved surface.

Further, in the polygonal surface 12 which serves as a rake face, a planar boss surface 12a perpendicular to the insert center line L is formed around an opening of the mounting hole 16, and the mounting hole 16 opens on the boss surface 12a. Furthermore, an inclined portion 12b that is inclined to protrude in the direction of the insert center line L (outward from the insert main body in the direction of the insert center line L) as it goes from the boss surface 12a toward the cutting edge 15 is formed on the cutting edge 15 side in an outer periphery side of the polygonal surface 12 from the boss surface 12a.

Figure 7:
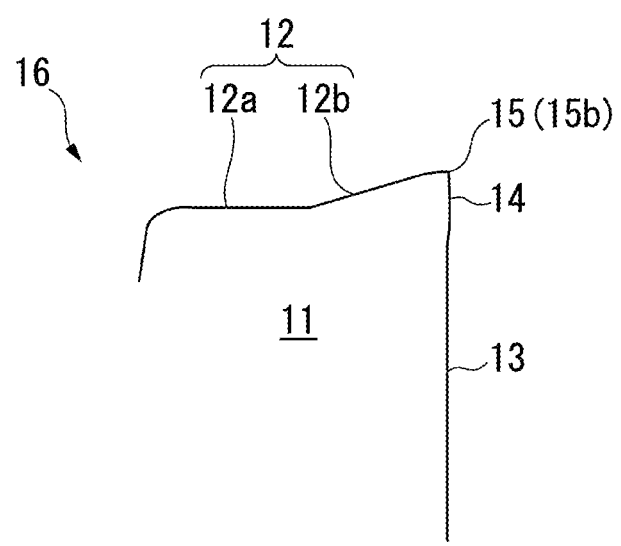
FIG. 7 is a sectional view along line ZZ in FIG. 2.

In the present embodiment, the entire length of the corner edge 15a and the major cutting edge 15b of the cutting edge 15 and a portion of the minor cutting edge 15d which is in contact with the corner edge 15a are formed in the intersecting ridgeline between the inclined portion 12b and the flank face 14. In the present embodiment, as shown in FIG. 7, in a cross section orthogonal to the major cutting edge 15b, the inclined portion 12b is inclined to protrude in the direction of the insert center line L at a predetermined inclination as it goes from the boss surface 12a toward the major cutting edge 15b side, and has a positive land on the major cutting edge 15b side. Further, a portion of the minor cutting edge 15d on a side opposite to the corner edge 15a extends to a region of the boss surface 12a.

Here, the cutting edge 15 protrudes furthest from the boss surface 12a in the direction of the insert center line L at a periphery of the first end of the corner edge 15a, retracts in the direction of the insert center line L as it goes away from the first end of the corner edge 15a along the major cutting edge 15b and the minor cutting edge 15d, and retracts furthest in the direction of the insert center line L at a portion of the minor cutting edge 15d at which the region of the boss surface 12a is formed and a portion of the wiper edge 15c.

Figure 1:
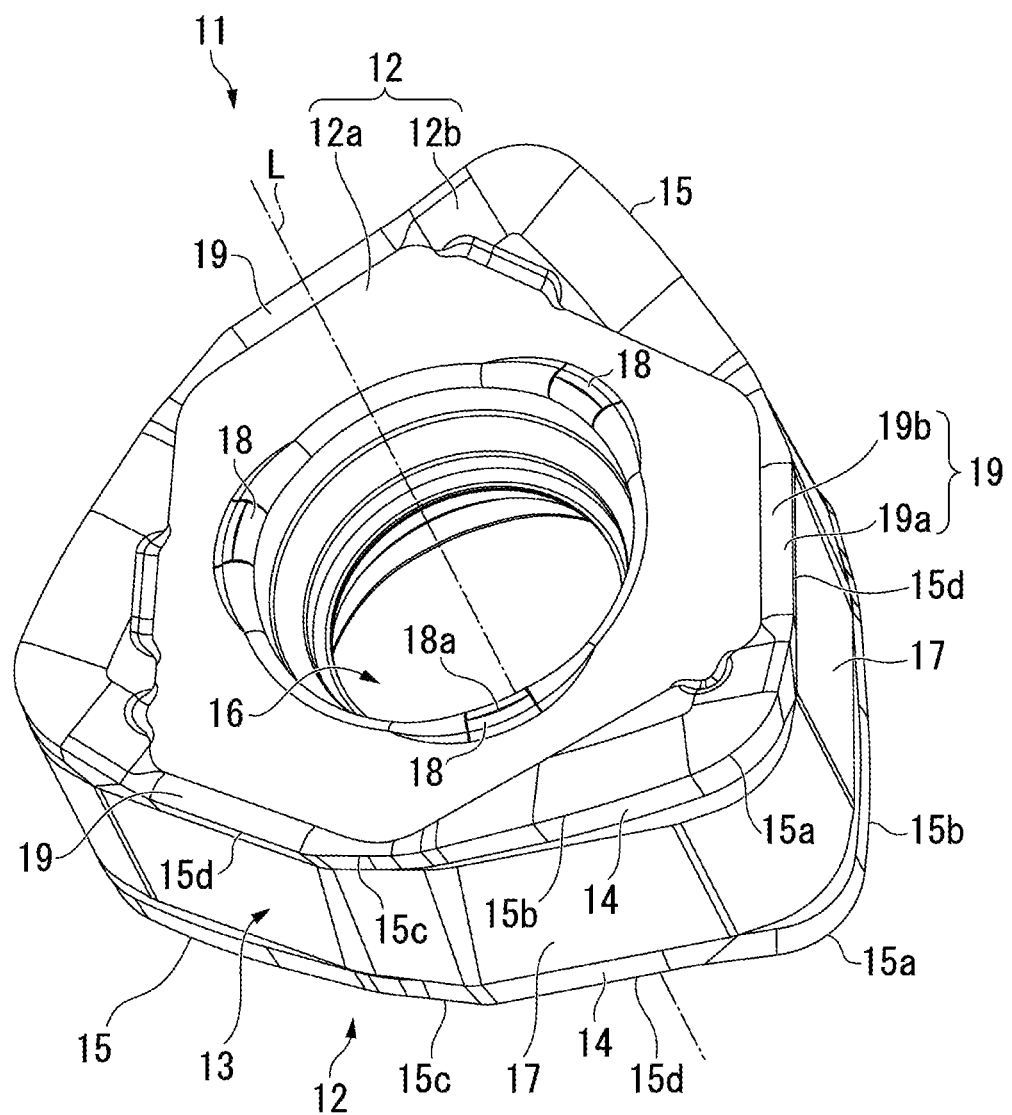
FIG. 1 is a perspective view showing a first embodiment of a cutting insert of the present invention.
Figure 5:
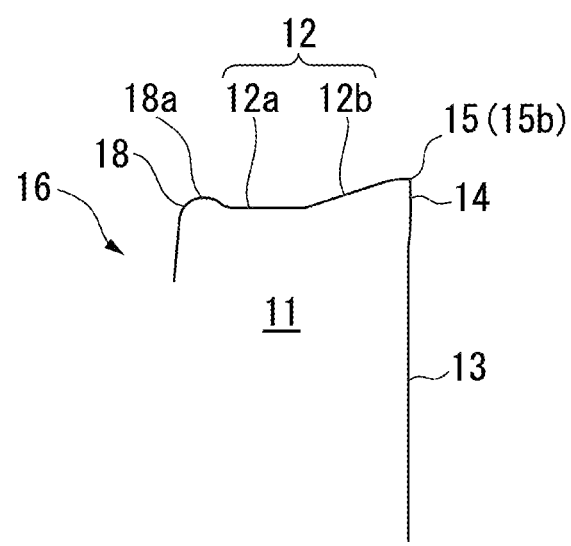
FIG. 5 is a sectional view along line XX in FIG. 2.

A plurality of protrusions 18 protruding with respect to the boss surface 12a along the insert center line L (outward from the insert main body in the direction of the insert center line L) are formed on the opening of the mounting hole 16 in the polygonal surface 12, that is, the opening of the mounting hole 16 to the boss surface 12a at intervals in a peripheral direction in an inner periphery side region of the major cutting edge 15b of the polygonal surface 12 as shown in FIGS. 1 and 2. The inner periphery side region of the major cutting edge 15b is a region on the polygonal surface 12 on the inside of the major cutting edge 15b toward the center of the polygonal surface 12 when seen in the direction facing the polygonal surface 12, and is defined as a region interposed between a straight line M1 connecting a first end of the major cutting edge (a first end portion of the major cutting edge 15b) and the center of the polygonal surface 12 to each other and a straight line M2 connecting the second end of the major cutting edge 15b (a second end portion of the major cutting edge 15b) and the center of the polygonal surface 12 to each other. Being formed at intervals in the peripheral direction means that the plurality of protrusions 18 provided in a plurality of inner regions corresponding to a plurality of the major cutting edges 15b are provided at intervals. In the cross section orthogonal to the major cutting edge 15b as shown in FIG. 5, the protrusions 18 rise while drawing a concave curve such as a concave arc which is in contact with the boss surface 12a as it goes toward the inner periphery side of the polygonal surface 12, protrude in the direction of the insert center line L while drawing a convex curve such as a convex arc which is in contact with the concave curve and then retract, and are in contact with an inner periphery of the opening of the mounting hole 16.

Figure 8:
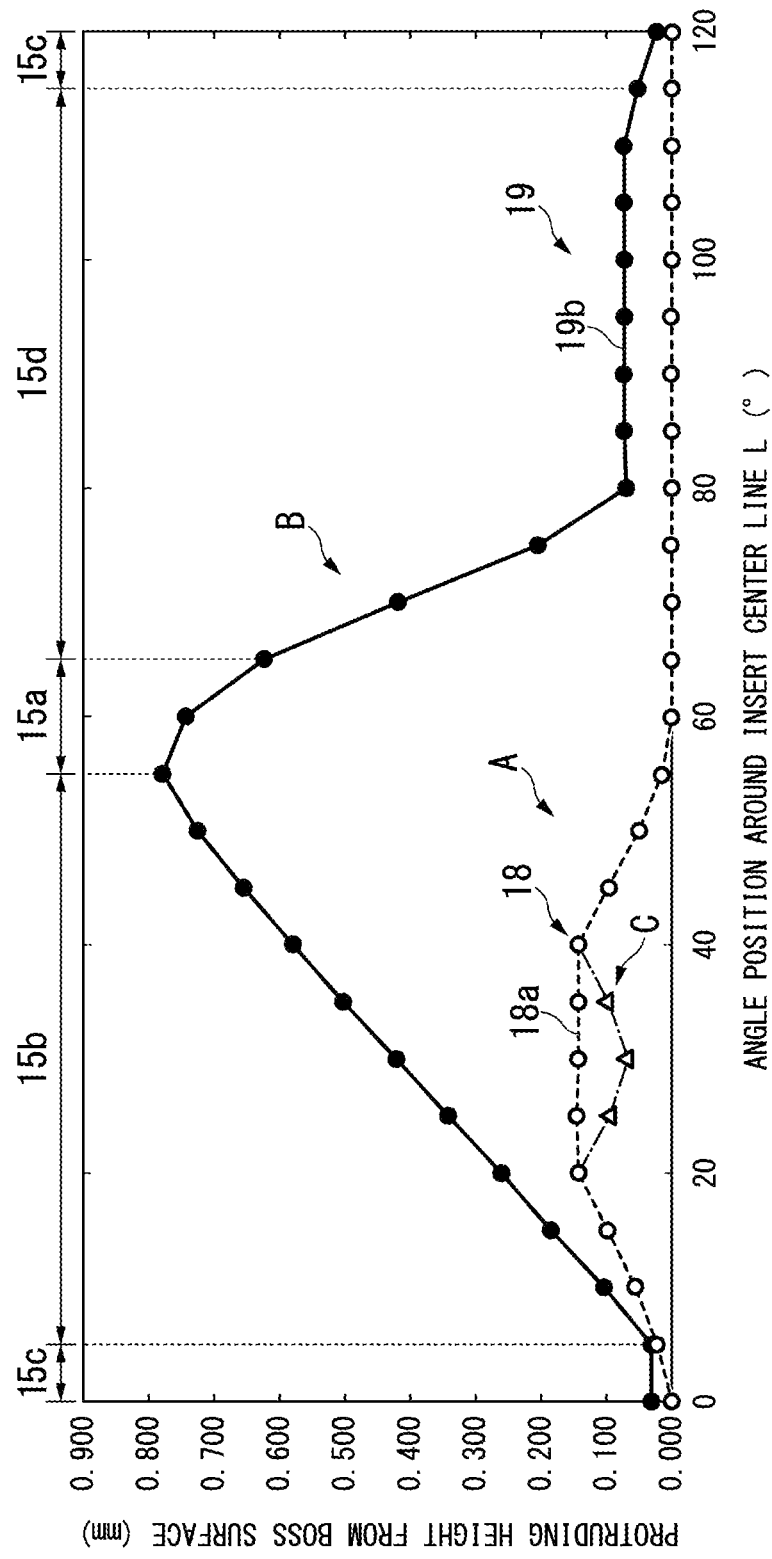
FIG. 8 is a diagram showing a protruding height from a boss surface around an opening of a mounting hole and a cutting edge in a cross section along an insert center line of the embodiment shown in FIG. 1.
Figure 9:
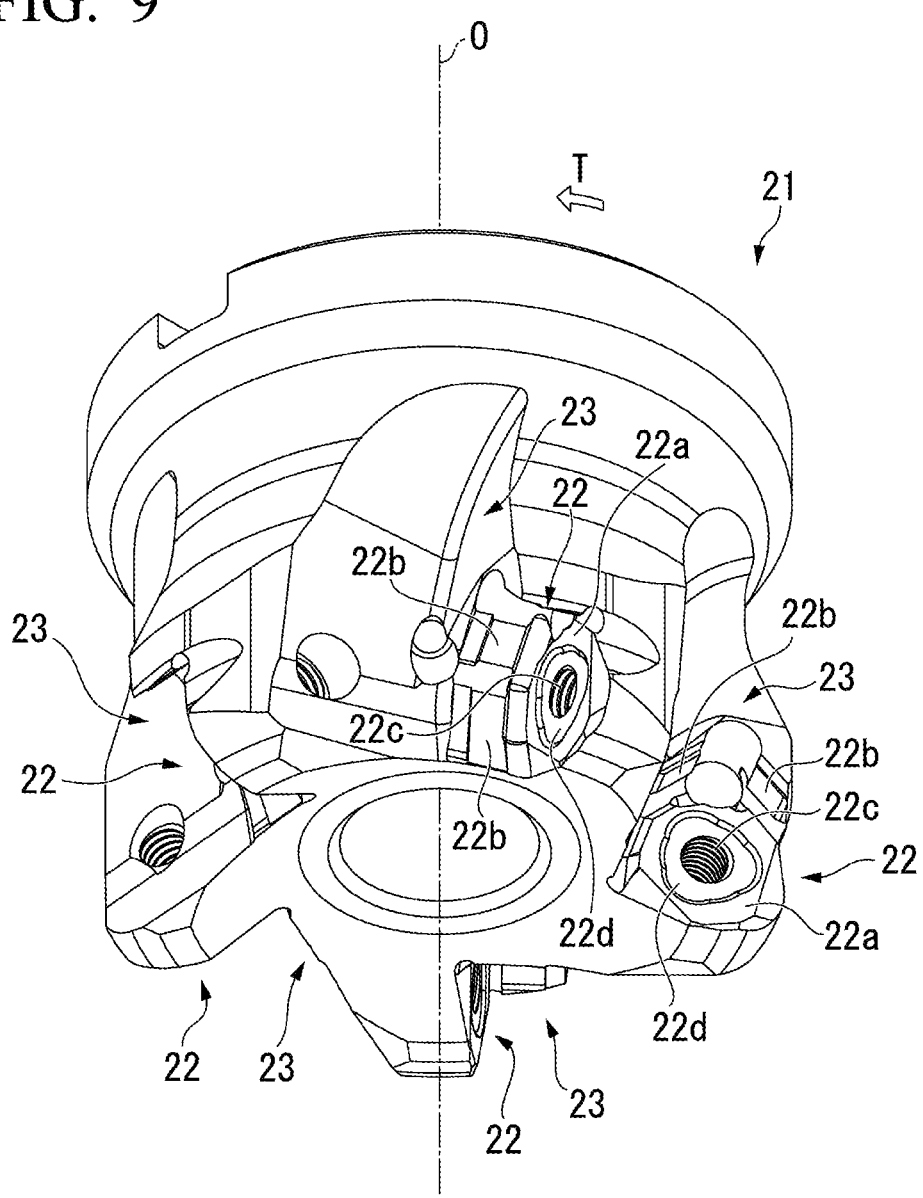
FIG. 9 is a perspective view of a tool main body in an embodiment of an indexable cutting tool of the present invention on which the cutting insert of the embodiment shown in FIG. 1 is to be detachably mounted.
Figure 10:
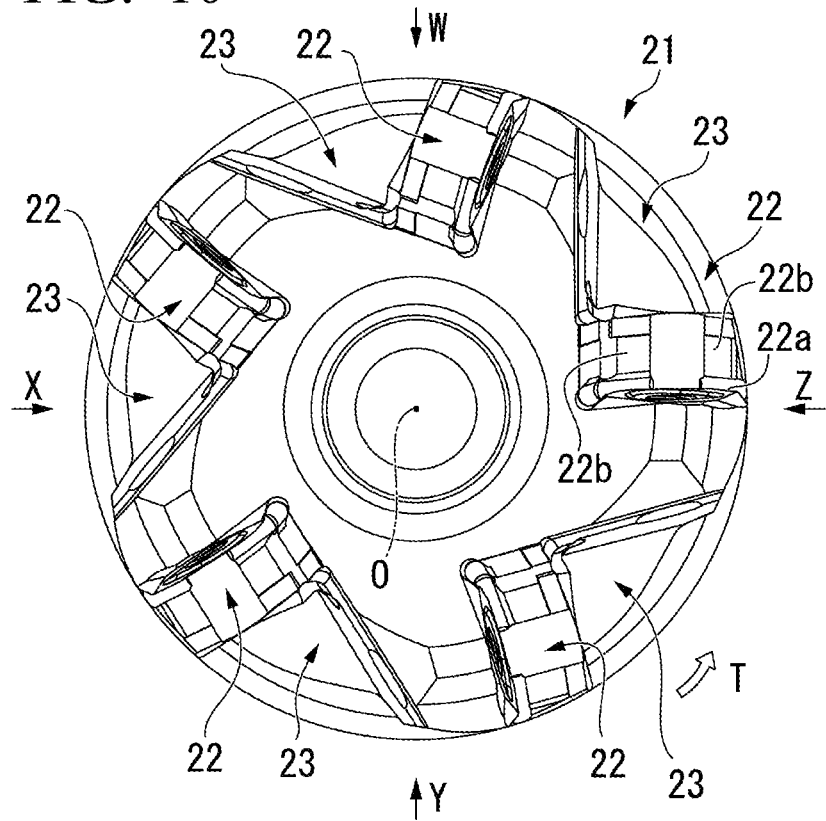
FIG. 10 is a bottom view of the tool main body shown in FIG. 9.
Figure 11:
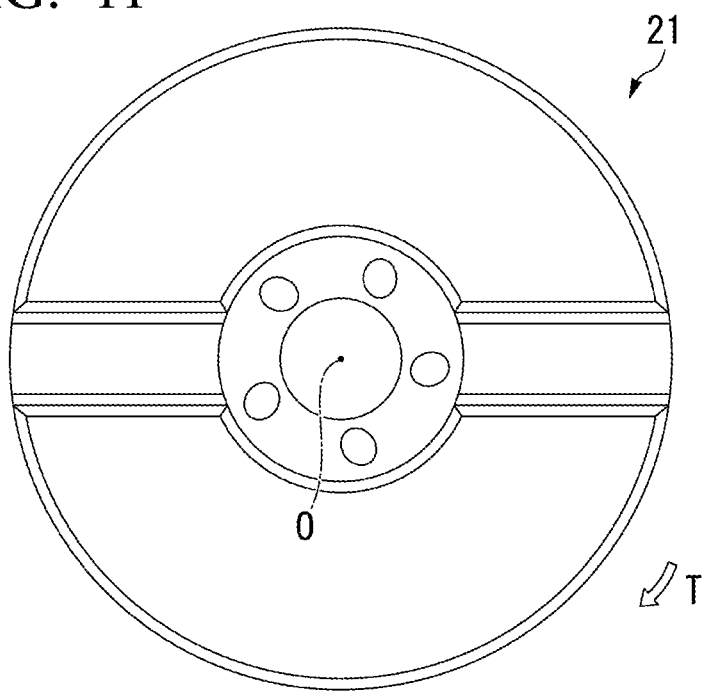
FIG. 11 is a plan view of the tool main body shown in FIG. 9.

Here, a diagram A shown with white circles of FIG. 8 shows protruding heights of the opening of the mounting hole 16 from the boss surface 12a in the cross section along the insert center line L of the cutting insert of the present embodiment. As shown in FIG. 2, a position of approximately ½ of the length of the wiper edge 15c of one cutting edge 15 is set to 0°, and a protruding height of the opening of the mounting hole 16 in the cross section at each position shifted by 5° each in the counterclockwise direction centered on the insert center line L in FIG. 2 is shown in the range of 120° up to a position of approximately ½ of the length of the wiper edge 15c of the other cutting edge 15 that intersects with the minor cutting edge 15d on the counterclockwise side.

As shown in the diagram A of FIG. 8, in the peripheral direction of the opening of the mounting hole 16, the protrusions 18 of the present embodiment are formed to gradually protrude from the boss surface 12a toward furthest protruding portions 18a having the furthest protruding height, extend with a predetermined length around the opening of the mounting hole 16 while maintaining the furthest protruding height that is predetermined, and then gradually retract in the direction of the insert center line L so that the protruding height becomes to the height of the boss surface 12a. However, the protrusions 18 may gradually protrude from the boss surface 12a and then gradually retract without having the predetermined protruding height and the predetermined length, or may have a wavy shape that has a plurality of protruding ends as shown in a diagram C with triangles of FIG. 8 in which they protrude from the boss surface 12a, retract with or without the predetermined protruding height and the predetermined length, and then protrude again.

Further, as also shown in the diagram A of FIG. 8, in the present embodiment, in the protrusions 18, the furthest protruding portions 18a that protrude furthest from the boss surface 12a are located within the inner periphery side region of the major cutting edge 15b. That is, when seen in the direction facing the polygonal surface 12, as shown in FIG. 2, the furthest protruding portions 18a of the protrusions 18 are located between the straight line M1 connecting the first end of the corner edge 15a and the insert center line L to each other and the straight line M2 connecting the first end of the major cutting edge 15b on the side opposite to the first end of the corner edge 15a and the insert center line L to each other. The protruding height of the furthest protruding portions 18a of the protrusions 18 from the boss surface 12a is, for example, in the range of 0.1 mm to about mm as shown in FIG. 8.

Further, in a diagram B shown with black circles in FIG. 8, the cross section along the insert center line L at the position of approximately ½ of the length of the wiper edge 15c of one cutting edge 15 is similarly set to the position of 0°, and the protruding height of the portion that protrudes furthest from the boss surface 12a of a peripheral portion of the cutting edge 15 in the cross section along the insert center line L at each position shifted by 5° each in the counterclockwise direction centered on the insert center line L in FIG. 2 is shown in the range of 120° up to the position of approximately ½ of the length of the wiper edge 15c of the other cutting edge 15. Here, regions indicated by reference signs 15a to 15d in FIG. 8 are a region of the corner edge 15a, a region of the major cutting edge 15b, a region of the wiper edge 15c, and a region of the minor cutting edge 15d of the cutting edge 15.

Figure 6:
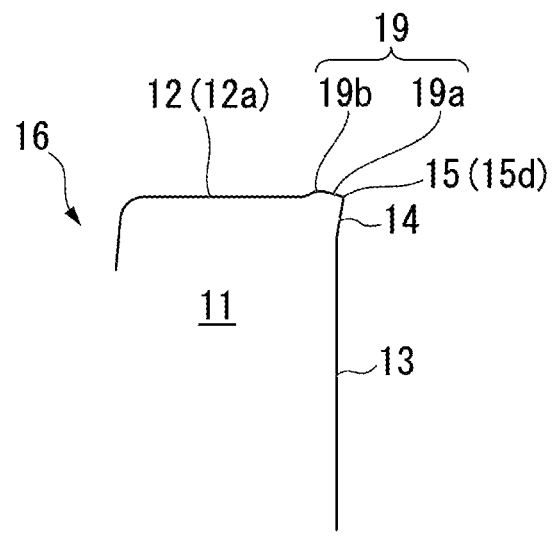
FIG. 6 is a sectional view along line YY in FIG. 2.

Further, in the present embodiment, a protruding ridge portion 19 that protrudes with respect to the boss surface 12a (outward from the insert main body in the direction of the insert center line L from the boss surface 12a) along the minor cutting edge 15d extending to the region of the boss surface 12a is formed on an outer peripheral portion of the boss surface 12a. Similar to the protrusions 18, in the cross section orthogonal to the minor cutting edge 15d as shown in FIG. 6, the protruding ridge portion 19 is also formed to rise and protrude from the boss surface 12a while drawing a concave curve such as a concave arc which is in contact with the boss surface 12a from the inner periphery side of the polygonal surface 12 as it goes toward the outer periphery side of the polygonal surface 12, to protrude in the direction of the insert center line L while drawing a convex curve such as a convex arc which is in contact with the concave curve on the inner periphery side of the polygonal surface 12 and then retract on the outer periphery side of the polygonal surface 12 in the direction of the insert center line L, and to intersect with the flank face 14 via an inclined face 19a in a straight line shape which is inclined to the polygonal surface 12 side opposite to the subject polygonal surface 12. The minor cutting edge 15d extending to the region of the boss surface 12a is formed in the intersecting ridgeline between the inclined face 19a and the flank face 14.

The position of the minor cutting edge 15d formed at the intersecting ridgeline between the inclined face 19a and the flank face 14 in the direction of the insert center line L is equivalent to the positions of the boss surface 12a and the wiper edge 15c in the direction of the insert center line L. In addition, as shown in the diagram B of FIG. 8, the protruding ridge portion 19 also extends from the rake face of the portion of the minor cutting edge 15d which is continuous with the corner edge 15a to the side opposite to the corner edge 15a with a predetermined protruding height and a predetermined length, and then extends such that it gradually retracts in the direction of the insert center line L toward the wiper edge 15*c* of the other cutting edge 15 which intersects with this minor cutting edge 15*d* to lower the protruding height. Here, the protruding height of the furthest protruding portion 19*b* of the protruding ridge portion 19 which protrudes furthest from the boss surface 12*a* is lower than the protruding height of the furthest protruding portions 18*a* of the protrusions 18.

Here, the cutting insert having the insert main body 11 formed of the hard material such as the cemented carbide is manufactured according to the basic process of powder metallurgy. That is, in a case in which the insert main body 11 is made of the cemented carbide, powder press forming with a mold is performed using a granulated powder containing tungsten carbide powder and cobalt powder as main components, and optionally chromium, tantalum, and the like as sub components. A press formed body thus obtained is sintered for a predetermined time in a sintering furnace controlled to an appropriate atmosphere and temperature, and thus it is possible to manufacture a sintered body to be the insert main body 11. The basic shape of the insert main body 11 is reflected by the design of the mold, and the detailed shape of the insert main body 11, that is, the shape of the protrusions 18, the protruding ridge portion 19, the inclined portion 12*b*, or a gently inclined portion or a steeply inclined portion that will be described later is obtained by mold forming.

The cutting insert of the present embodiment as described above is detachably mounted on the insert mounting seat 22 formed on the outer periphery of the tip end portion of the tool main body 21 of the indexable cutting tool such as an indexable end mill as shown in FIGS. 9 to 16, and constitutes the indexable cutting tool according to an embodiment of the present invention as shown in FIGS. 17 to 24. The tool main body 21 has a substantially cylindrical shape centered on an axis O, and at the time of cutting operation, a posterior end portion thereof is gripped by a main shaft of a machine tool and is rotated around the axis O in a tool rotation direction T, so that the cutting insert of the above-described embodiment mounted on the insert mounting seat 22 performs the cutting operation on a work material.

A plurality of (five in the present embodiment) chip pockets 23 are formed on the outer periphery of the tip end portion of the tool main body 21, and the insert mounting seat 22 is formed in a concave shape on an outer periphery of a tip end portion of a wall face of the insert pocket 23 which faces the tool rotation direction T, and includes a planar bottom surface 22*a* that faces the tool rotation direction T side, and a plurality of planar wall surfaces 22*b* that are disposed at intervals on the tool rotation direction T side from the bottom surface 22*a* and can come into contact with the insert constraining surface 17 of the insert main body 11.

Figure 12:
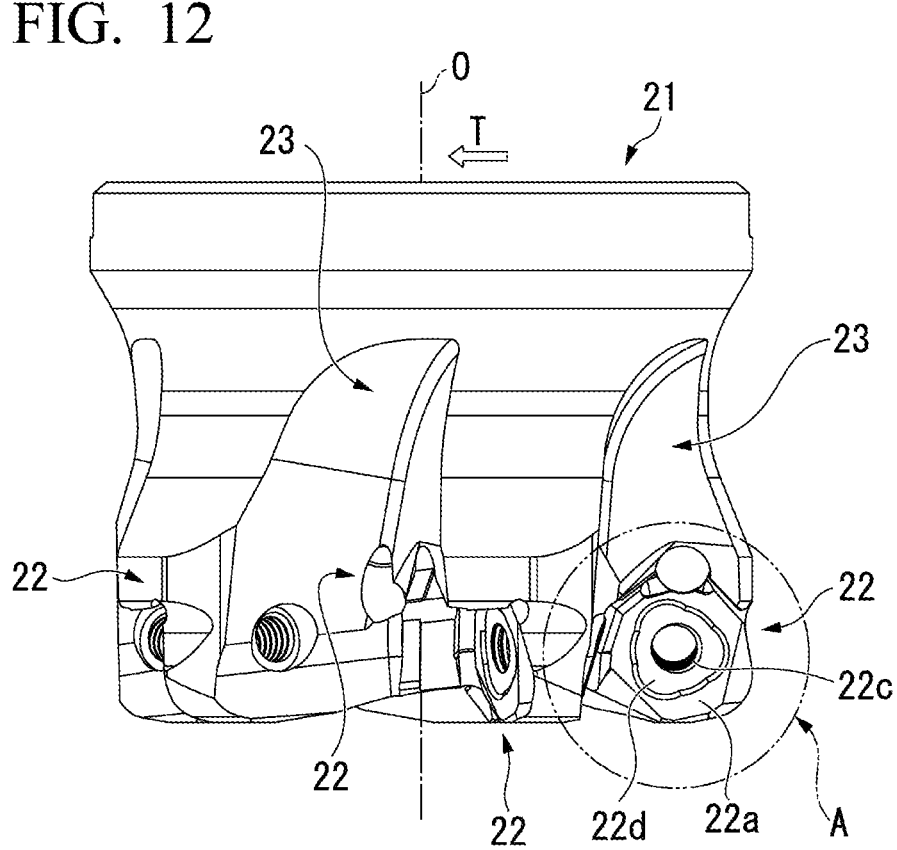
FIG. 12 is a side view in a direction of arrow W in FIG. 10.
Figure 13:
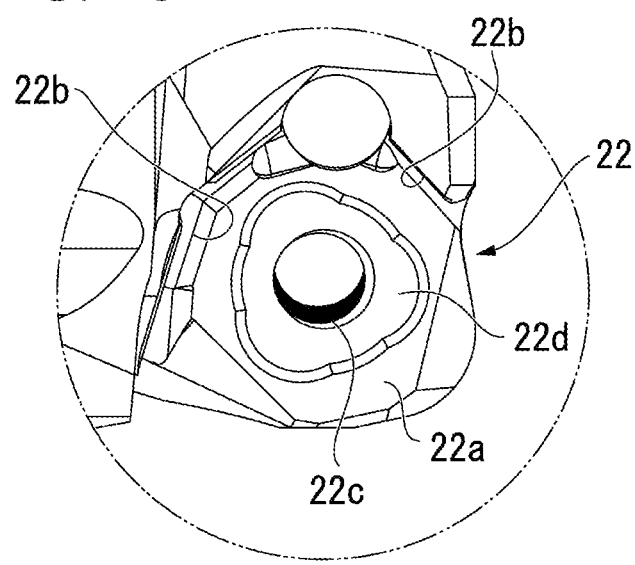
FIG. 13 is an enlarged view of a portion A in FIG. 12.
Figure 14:
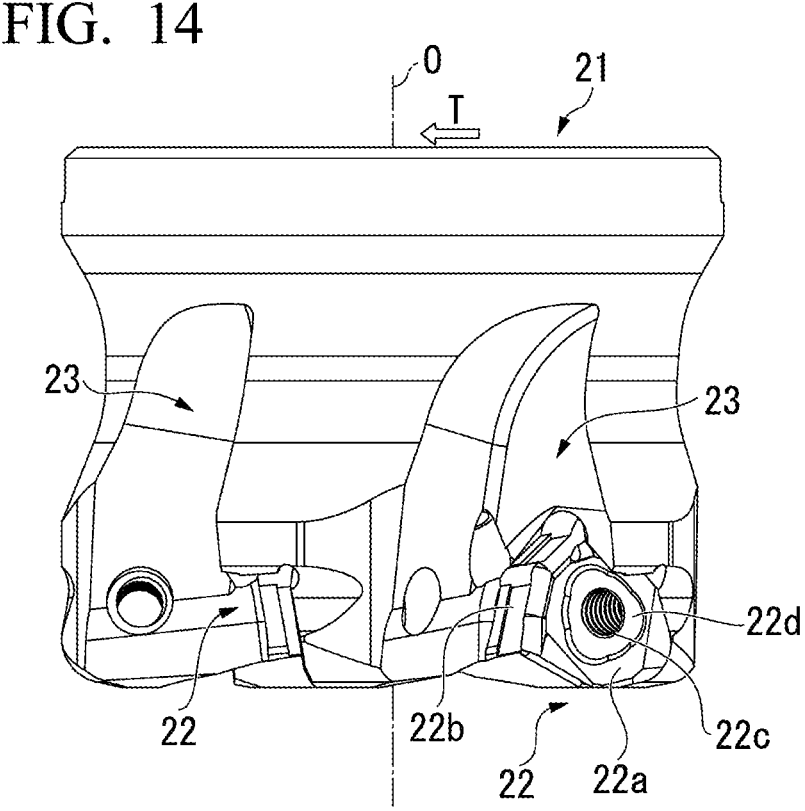
FIG. 14 is a side view in a direction of arrow X in FIG. 10.
Figure 15:
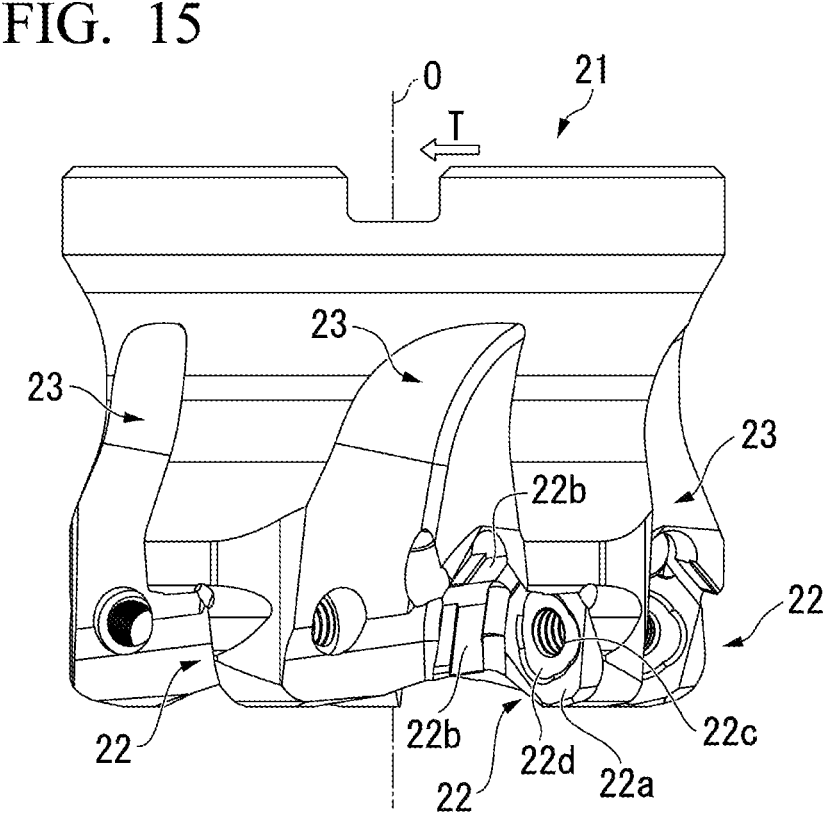
FIG. 15 is a side view in a direction of arrow Y in FIG. 10.
Figure 16:
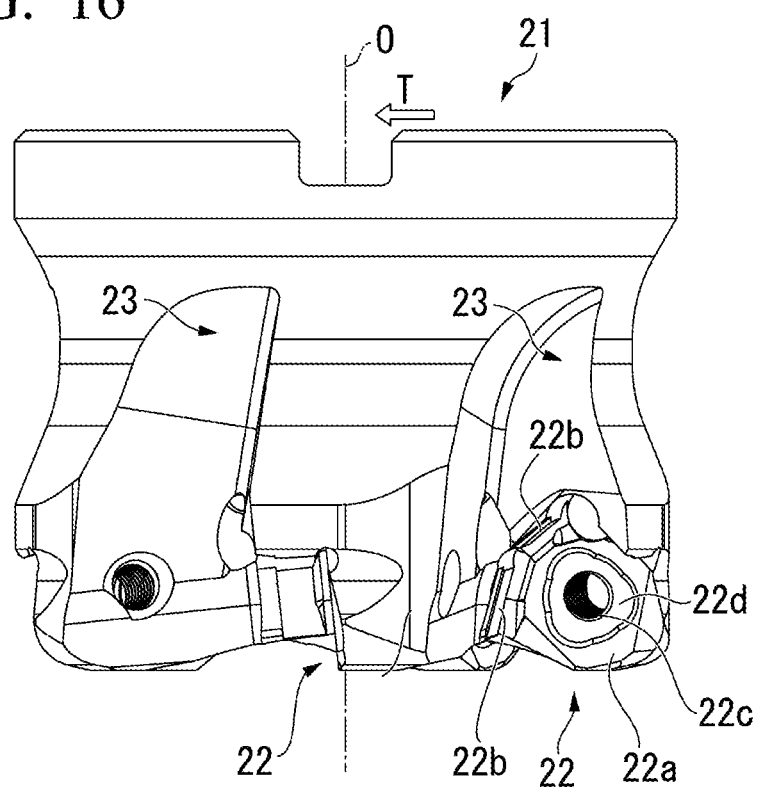
FIG. 16 is a side view in a direction of arrow Z in FIG. 10.

Further, a screw hole 22*c* into which a clamp screw 24 inserted into the mounting hole 16 is screwed is formed in the bottom surface 22*a*, and accommodation recesses 22*d* for accommodating the protrusions 18 formed on the opening of the attachment hole 16 of the other polygonal surface 12 serving as the seating surface of the insert main body 11 are formed around an opening of the screw hole 22*c*. When seen from the tool rotation direction T side, as shown in FIG. 12, the accommodation recesses 22*d* are formed in a shape in which a plurality of (three) crescent-shaped recesses for accommodating the plurality of (three) protrusions 18 are formed around a circular recess centered on the screw hole 22*c* at equal intervals in a peripheral direction.

The cutting insert of the above-described embodiment is seated on the insert mounting seat 22 in such a manner that one polygonal surface 12 of the insert main body 11 is caused to serve as the rake face and to face the tool rotation direction T side, the boss surface 12*a* of the other polygonal surface 12 is closely attached to the bottom surface 22*a* of the insert mounting seat 22, and the protrusions 18 protruding with respect to the boss surface 12*a* are accommodated in the accommodation recesses 22*d*. At this time, the corner edge 15*a* located at one corner of the one polygonal surface 12 protrudes to the outer periphery side of the tool main body 21, and the major cutting edge 15*b* extending from a first end of the corner edge 15*a* faces the tip end side of the tool main body 21.

Further, in a state in which the cutting insert is seated on the insert mounting seat 22 in this manner, the wiper edge 15*c* extending from a first end of the major cutting edge 15*b* facing the tip end side of the tool main body 21 is disposed to have a concavity angle of 2° or less with respect to a plane perpendicular to the axis O. That is, the wiper edge 15*c* is disposed along the plane perpendicular to the axis O, or is disposed to be inclined such that it goes toward a posterior end side of the tool main body 21 at an angle of 2° or less with respect to this plane as it goes toward the inner periphery side of the tool main body.

The cutting insert seated on the insert mounting seat 22 in this manner is fixed by screwing the clamp screw 24 inserted into the mounting hole 16 of the insert main body 11 into the screw hole 22*c* of the bottom surface 22*a* of the insert mounting seat 22. At this time, the insert constraining surface 17 of the side surface 13 that is continuous with the cutting edge 15 not used for cutting in the insert main body 11 is brought into contact with the wall face 22*b* of the insert mounting seat 22 to constrain the rotation of the insert main body 11 around the insert center line L.

The indexable cutting tool to which the cutting insert is mounted in this manner is fed in a direction perpendicular to the axis O while being rotated around the axis O during normal cutting, so that the work material is cut exclusively by the corner edge 15*a* protruding to the outer periphery side of the tool main body 21, and the major cutting edge 15*b* and the wiper edge 15*c* which are continuous with a first end of the corner edge 15*a*. Further, in an engraving operation of a pocket by inclination cutting operation, the tool main body 21 is also fed to the tip end side in the axis O direction, and cutting is also performed by the minor cutting edge 15*d* intersecting with the wiper edge 15*c*.

Here, the major cutting edge 15*b* has a straight line shape or a convex curve shape having a larger radius of curvature than the corner edge 15*a*, and the wiper edge 15*c* also has a straight line shape or a convex curve shape having a larger radius of curvature than the convex curve formed by the major cutting edge 15*b*, so that the thickness of a chip generated by an inner periphery side portion of the tool main body 21 is thin, and it is possible to suppress an increase in cutting resistance even when the tool main body 21 is fed at a high feed amount.

Further, in the cutting insert and the indexable cutting tool having the above-described configuration, a plurality of protrusions 18 protruding with respect to the boss surface 12*a* formed on the polygonal surface 12 around the opening of the mounting hole 16 are formed on the opening of the mounting hole 16 in the two polygonal surfaces 12 of the insert main body 11 at intervals in the peripheral direction in the inner periphery side region of the major cutting edge 15*b*. Therefore, the chip that is generated by the major cutting edge 15*b* facing the tip end side of the tool main body 21 and flows out to the inner periphery side of the polygonal surface 12 is brought into sliding contact with the protrusions 18 located in the inner periphery side region of the major cutting edge 15b, and thus it is possible to give resistance to the chip and to control its outflow direction.

For example, since the protrusions 18 are formed at intervals in the peripheral direction, the chip which is brought into sliding contact with the protrusion 18 in the inner periphery side region of the major cutting edge 15b facing the tip end side of the tool main body 21 and to which resistance is given is guided to a portion between the protrusions 18 adjacent to the subject protrusion 18 in the counterclockwise direction in FIG. 2 and is curled, and thus it is possible to control the outflow direction such that the chip does not flow the minor cutting edge 15d extending to the posterior end side of the tool main body 21 from the corner edge 15a protruding to the outer periphery side of the tool main body 21 and to process the chip. Therefore, when the engraving operation of the pocket is performed, it is possible to prevent the chip from being caught between the minor cutting edge 15d extending from the corner edge 15a to the posterior end side of the tool main body 21 and an inner wall surface of the pocket and a fracture from being generated in the minor cutting edge 15d.

On the other hand, since the plurality of protrusions 18 are formed on the opening of the mounting hole 16 at intervals in the peripheral direction, the boss surface 12a of the polygonal surface 12 can be formed to reach the opening of the mounting hole 16 in a portion between the intervals, and the bottom surface 22a of the insert mounting seat 22 can also be formed up to a position close to the opening of the screw hole 22c. Therefore, even if the protrusions 18 are formed, it is possible to prevent an area of close attachment between the boss surface 12a of the insert main body 11 and the bottom surface 22a of the insert mounting seat 22 from becoming too small as compared with a case in which the protrusions 18 are formed over the entire periphery of the opening of the mounting hole 16. Further, if the protrusions 18 are formed over the entire periphery of the opening of the mounting hole 16 as described above, the chip may remain in contact with the protrusions 18 to cause an increase in cutting resistance, however in the cutting insert having the above-described configuration, the protrusions are formed at intervals in the peripheral direction, and thus there is no possibility of causing such an increase in cutting resistance.

Moreover, the protrusions 18 are formed on the opening of the mounting hole 16 on the innermost periphery side of the boss surface 12a, and in the outer periphery side of the boss surface 12a, it is possible to secure the area of close attachment with the bottom surface 22a of the insert mounting seat 22 which is the same as the related art. Therefore, it is possible to prevent mounting stability of the cutting insert from being impaired, the insert main body 11 can be reliably held by the insert mounting seat 22, and stable cutting can be performed over a long period of time.

Further, in the cutting insert of the present embodiment, the furthest protruding portions 18a of the protrusions 18 which protrude furthest from the boss surface 12a extend with a predetermined protruding height and a predetermined length around the opening of the mounting hole 16. Therefore, not only when a chip having a wide width is generated but also when a chip having a narrow width is generated by the major cutting edge 15b, it is possible to reliably bring the chip into sliding contact with the protrusions 18 and to control the outflow direction, and it is also possible to prevent wear of the protrusions 18 due to the sliding contact of the chip and to achieve stable chip processing over a long period of time. A height difference in the direction of the insert center line L between the furthest protruding portions 18a of the protrusions 18 and a position of the cutting edge 15 which protrudes furthest in the direction of the insert center line L (in the present embodiment, a first end of the corner edge 15a) is preferably in the range of 0.4 mm to 1.0 mm. If the height difference is less than 0.4 mm, it may not be possible to effectively control the flow and a discharging property of the chip, while it becomes difficult to manufacture an insert main body with a height difference of more than 1.0 mm.

Further, in the present embodiment, when seen in the direction facing the polygonal surface 12 of the insert main body 11, as shown in FIGS. 2 and 8, the furthest protruding portions 18a are located between the straight line M1 connecting the first end of the corner edge 15a and the insert center line L to each other and the straight line M2 connecting the first end of the major cutting edge 15b on the side opposite to the first end of the corner edge 15a and the insert center line L to each other. Therefore, when high feeding processing or high cutting operation is performed, the chip which is generated by the major cutting edge 15b and flows out to the inner periphery side of the polygonal surface by making the polygonal surface 12 serving as the rake face straddle the straight lines M1 and M2 can be more reliably brought into sliding contact with the furthest protruding portions 18a of the protrusions 18. Further, by bringing the chip into sliding contact with the furthest protruding portions 18a in this manner, it is possible to prevent the chip from coming into sliding contact with the clamp screw 24, so that it is possible to prevent wear of the clamp screw 24 and the mounting stability of the cutting insert can be further improved.

Here, in a case in which the insert main body 11 has a triangular plate shape in which the two polygonal surfaces 12 each have three corners as in the present embodiment, the furthest protruding portions 18a of the protrusions 18 are preferably located in an angle range of 15° to 40° centered on the insert center line L from the straight line M2 connecting a first end of the major cutting edge 15b on the side opposite to a first end of the corner edge 15a and the insert center line L to each other toward the corner edge 15a side with which the major cutting edge 15b is continuous, between the straight lines M1 and M2, when seen in the direction facing the polygonal surface 12.

That is, in a case in which the insert main body 11 having the triangular plate shape is mounted on the tool main body 21, such an angle range is a portion which is located on the inner periphery side of the tool main body 21 in the major cutting edge 15b and at which a thin chip is generated, and the furthest protruding portions 18a of the protrusions 18 are disposed in the inner periphery side region of the major cutting edge 15b in such a portion, and thus the outflow direction of the entire chip can be effectively controlled and the cutting resistance can be further reduced. Further, it is also possible to prevent premature wear of the protrusions 18 due to a thick chip scraping the furthest protruding portions 18a of the protrusions 18.

On the other hand, in the cutting insert of the present embodiment, the cutting edge 15 further includes a minor cutting edge 15d extending from the second end of the corner edge 15a to the other cutting edge 15 adjacent to the second end side of the corner edge 15a. In a case in which the engraving operation of the pocket is performed on a work material such as a mold by the inclination cutting operation, the minor cutting edge 15d which is located on the inner periphery side of the major cutting edge 15b facing the tip end side of the tool main body 21 as described above is also used for cutting. This minor cutting edge 15*d* extends to the region of the boss surface 12*a* on the side opposite to the corner edge 15*a*, and in the portion extending to the region of the boss surface 12*a*, the minor cutting edge is formed on the intersecting ridgeline between the inclined face 19*a* that goes toward the polygonal surface 12 side opposite to the subject polygonal surface 12 as it goes toward the outer periphery side of the subject polygonal surface 12 and the flank face 14.

Therefore, at the portion of the minor cutting edge 15*d* which extends to the region of the boss surface 12*a*, it is possible to increase an edge angle of the minor cutting edge 15*d* and to improve a cutting edge strength. Thus, when the engraving operation of the pocket is performed on the work material as described above, for example, in a state in which the outflow direction of the chip cannot be sufficiently controlled by the protrusions 18, even if the chip flows from the corner edge 15*a* facing the outer periphery side of the tool main body 21 toward the minor cutting edge 15*d* side extending to the posterior end side of the tool main body and is caught between the inner wall surface of the pocket and the minor cutting edge 15*d*, it is possible to prevent the fracture from being generated in the minor cutting edge 15*d*. Therefore, according to the present embodiment, in a case in which the insert main body 11 is rotated and reattached and the engraving operation is performed using the new cutting edge 15, it is possible to prevent a situation in which the minor cutting edge 15*d* of the new cutting edge 15 becomes unusable due to the fracture, and it is possible to reliably use the plurality of cutting edge 15 formed on the insert main body 11.

Further, in the present embodiment, to form the minor cutting edge 15*d* extending to the region of the boss surface 12*a* on the intersecting ridgeline between the inclined face 19*a* and the flank face 14 in this manner, the protruding ridge portion 19 that protrudes with respect to the boss surface 12*a* is formed on the outer peripheral portion of the polygonal surface 12 along the minor cutting edge 15*d* of a portion extending to the region of the boss surface 12*a*, and the inclined face 19*a* is formed on an outer peripheral surface of the protruding ridge portion 19 facing the outer periphery side of the polygonal surface 12. For this reason, even if the chip flows toward the minor cutting edge 15*d* side during the engraving operation as described above, before the chip is caught between the minor cutting edge 15*d* and the inner wall surface of the pocket, the chip is brought into sliding contact with an inner peripheral surface of the protruding ridge portion 19 that protrudes from the boss surface 12*a*, which faces the inner periphery side and receives resistance, and thus the chip is curled and processed. Therefore, it is possible to prevent the chip from being caught.

In the present embodiment, to form a portion of the minor cutting edge 15*d* which extends to the region of the boss surface 12*a* on the intersecting ridgeline between the inclined face 19*a* and the flank face 14 in this manner, the protruding ridge portion 19 that protrudes with respect to the boss surface 12*a* is formed on the outer peripheral portion of the polygonal surface 12 along the minor cutting edge 15*d* of a portion extending to the region of the boss surface 12*a*, and the outer peripheral surface of the protruding ridge portion 19 is formed as the inclined face 19*a*, but, without forming such a protruding ridge portion 19, as in a second embodiment of the cutting insert of the present invention shown in FIGS. 25 to 31, the chamfered inclined face 19*a* that is inclined toward the opposite polygonal surface 12 side without protruding with respect to the boss surface 12*a* as it goes toward the outer periphery side may be formed in the outer peripheral portion of the polygonal surface 12 in the region of the boss surface 12*a*, and a portion of the minor cutting edge 15*d* which extends to the region of the boss surface 12*a* may be formed on the intersecting ridgeline between the inclined face 19*a* and the flank face 14.

Even if the chamfered inclined face 19*a* is formed and the minor cutting edge 15*d* is formed on the intersecting ridgeline between the flank face 14 and the chamfered inclined face 19*a* in this manner, a large edge angle of the minor cutting edge 15*d* in the region of the boss surface 12*a* can be ensured and the cutting edge strength can be improved, and thus it is possible to prevent the fracture from being generated in the minor cutting edge 15*d* even if the chip is caught between the inner wall surface of the pocket and the minor cutting edge 15*d*. In the second embodiment shown in FIGS. 25 to 31 and third and fourth embodiments that will be described later, the same parts as those of the first embodiment are designated by the same reference signs and a description thereof will be omitted.

In the first embodiment, the boss surface 12*a* is perpendicular to the insert center line L, whereas the inclined portion 12*b* that is inclined to protrude in the direction of the insert center line L as it goes toward the cutting edge 15 side is formed in the outer peripheral portion of the polygonal surface 12, and the corner edge 15*a*, the major cutting edge 15*b*, and the portion of the minor cutting edge 15*d* which is in contact with the corner edge 15*a* are formed on the intersecting ridgeline between the inclined portion 12*b* and the flank face 14. Therefore, it is possible to increase a rake angle of each of the corner edge 15*a* and the major cutting edge 15*b* to a regular angle side to ensure sharp cutting quality, and it is possible to reduce the cutting resistance at the time of the high feeding processing or the high cutting operation.

In the first embodiment, the inclined portion 12*b* is inclined to protrude in the direction of the insert center line L at a predetermined inclination as it goes from the boss surface 12*a* toward the cutting edge 15 side except that it has a positive land on the cutting edge 15 side. However, as in a third embodiment of the cutting insert of the present invention shown in FIGS. 32 to 38, particularly in FIG. 38, in a cross section orthogonal to the major cutting edge 15*b*, the inclined portion 12*b* may have a first steeply inclined portion 20*a* that protrudes in the direction of the insert center line L as it goes from the boss surface 12*a* toward the major cutting edge 15*b* side, a gently inclined portion 20*b* that is continuous with the first steeply inclined portion 20*a* on the major cutting edge 15*b* side and protrudes in the direction of the insert center line L at a gradient gentler than the first steeply inclined portion 20*a* as it goes toward the major cutting edge 15*b* side, and a second steeply inclined portion 20*c* that is continuous with the gently inclined portion 20*b* on the major cutting edge 15*b* side and protrudes in the direction of the insert center line L at a gradient steeper than the gently inclined portion as it goes toward the major cutting edge 15*b* side.

Figure 38:
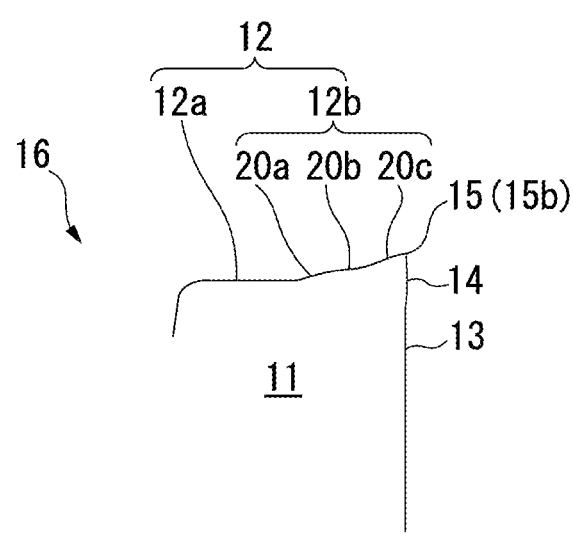
FIG. 38 is a sectional view along line ZZ in FIG. 33.
Figure 39:
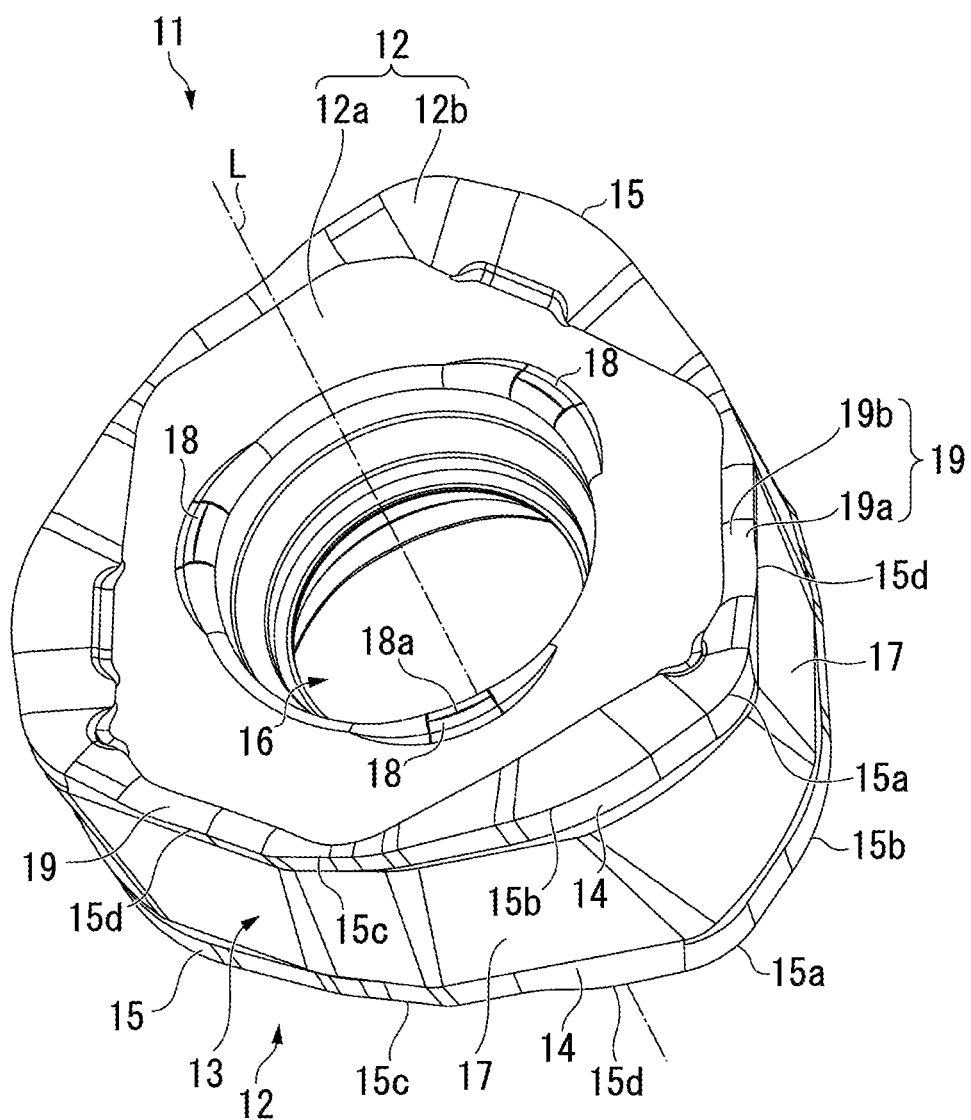
FIG. 39 is a perspective view showing a fourth embodiment of a cutting insert of the present invention.
Figure 40:
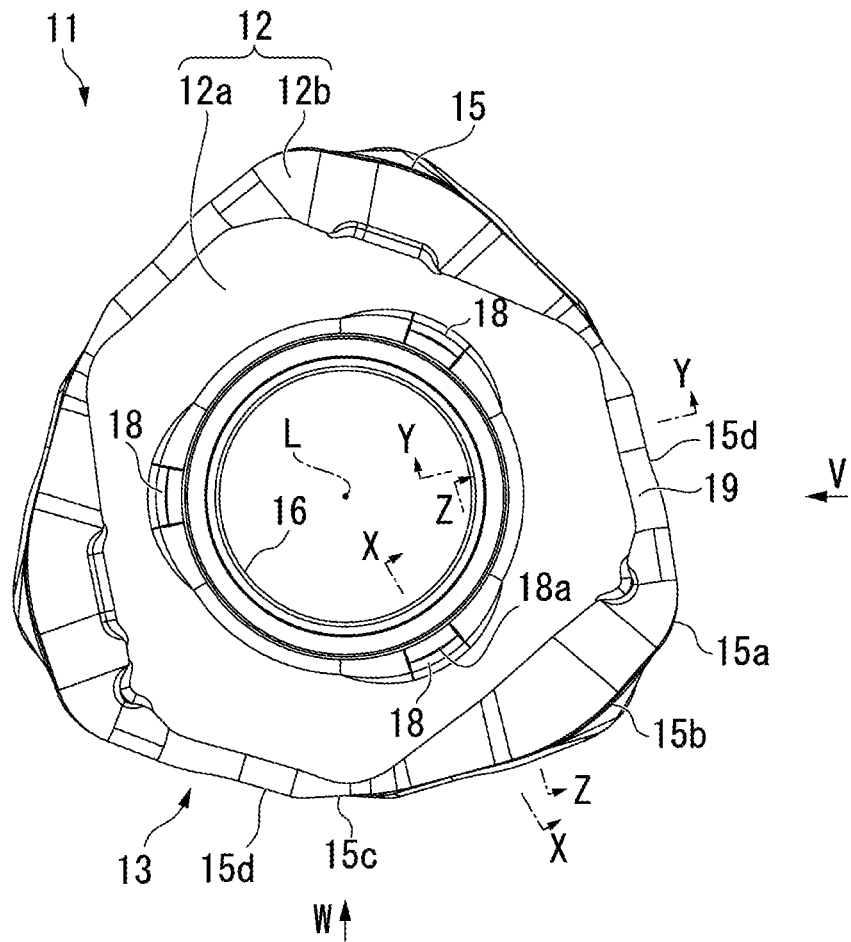
FIG. 40 is a plan view of the embodiment shown in FIG. 39 in a direction of an insert center line.
Figure 41:
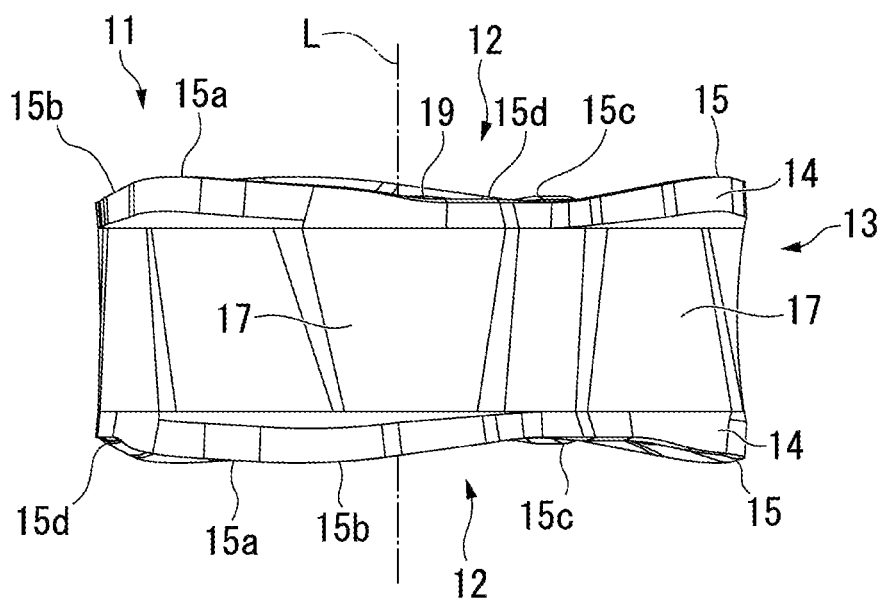
FIG. 41 is a side view in a direction of arrow V in FIG. 40.
Figure 42:
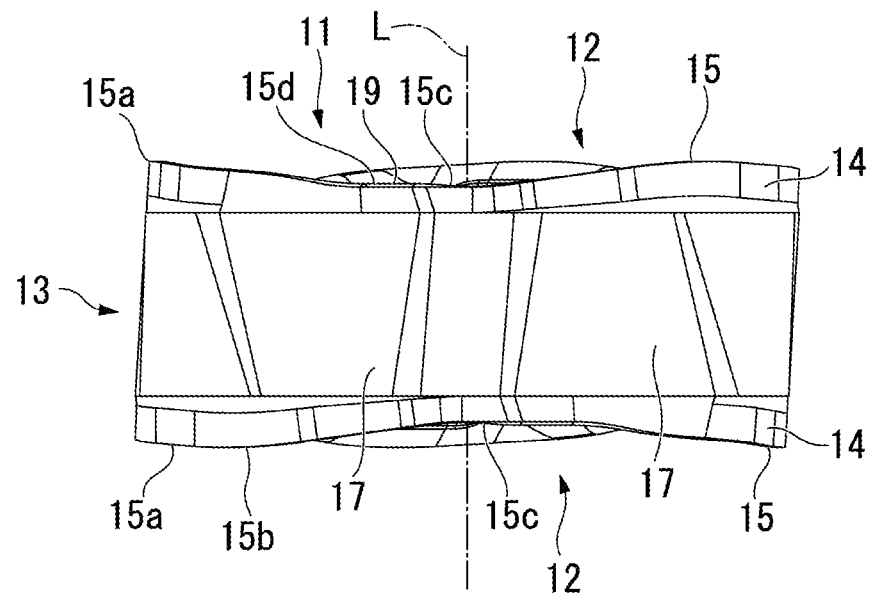
FIG. 42 is a side view in a direction of arrow W in FIG. 40.
Figure 43:
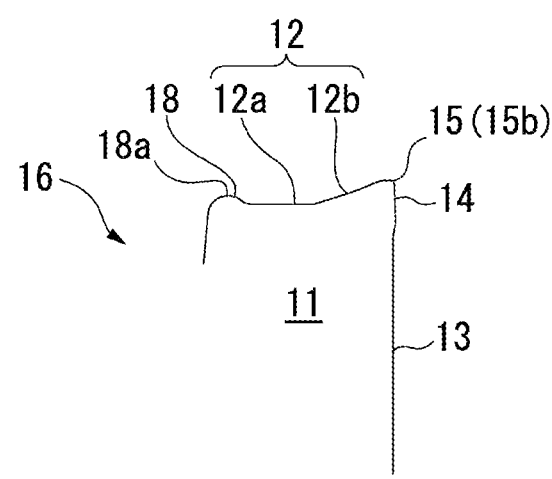
FIG. 43 is a sectional view along line XX in FIG. 40.
Figure 44:
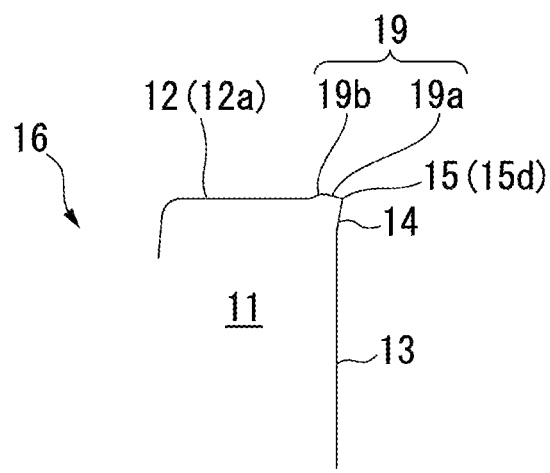
FIG. 44 is a sectional view along line YY in FIG. 40.
Figure 45:
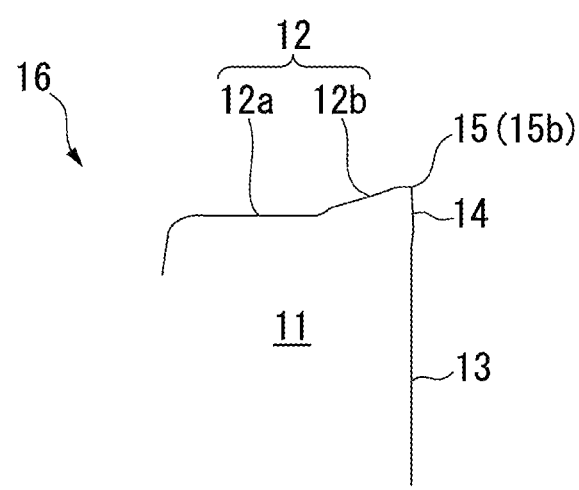
FIG. 45 is a sectional view along line ZZ in FIG. 40.

By providing the first and second steeply inclined portions 20*a* and 20*c* and the gently inclined portion 20*b* as described above, when the chip flows from the second steeply inclined portion 20*c* to the gently inclined portion 20*b*, or when the chip flows from the gently inclined portion 20*b* to the first steeply inclined portion 20*a*, it is possible to give resistance to the chip, and, particularly in the high feeding processing, even in a case in which a distance from the cutting edge 15 to the boss surface 12*a* or a height difference therebetween in the direction of the insert center line L is large, it is possible to improve a processing property of the chip. Preferably, connecting portions between the first and second steeply inclined portions 20a and 20c and the gently inclined portion 20b are smoothly connected in a concave-convex curved shape in a cross section orthogonal to the major cutting edge 15b as shown in FIG. 38. Preferably, the first and second steeply inclined portions 20a and 20c and the gently inclined portion 20b are substantially similar in a cross section orthogonal to the cutting edge 15 over the entire length of the cutting edge 15 formed on the inclined portion 12b.

Nest, FIGS. 39 to 45 show a fourth embodiment of a cutting insert of the present invention. The fourth embodiment has a first region in which a rake angle in the cross section along the insert center line L gradually increases as it goes from the end portion of the major cutting edge 15b on the side opposite to the corner edge 15a toward the corner edge 15a side, a second region in which the rake angle gradually decreases as it goes from the first region toward the corner edge 15a side, and a third region in which the rake angle gradually increases in the range smaller than the first region as it goes from the second region toward the minor cutting edge 15d side in a portion including at least a part of the corner edge 15a and the minor cutting edge 15d, and the rake angle in the third region is in the range of 15° to 18°.

Further, the cutting edge 15 may have a fourth region in which the rake angle gradually decreases at a rate of change larger than in the first to third regions as it goes from the third region toward the end portion of the minor cutting edge 15d on a side opposite to the corner edge 15a. Further, the rake angle in the second region may be in the range of 15° to 25°. Furthermore, in a case in which the insert main body 11 has a triangular plate shape in which the two polygonal surfaces 12 each have three corners, the position where the rake angle is maximum at a boundary between the first region and the second region may be in the angle range of 15° to 45° from a straight line passing through the end portion of the major cutting edge 15b on the side opposite to the corner edge 15a and the insert center line L toward the corner edge 15a side centered on the insert center line L, when seen in the direction facing the polygonal surface 12 along the insert center line L.

In the cutting insert of the fourth embodiment as described above, particularly in the high cutting operation, a portion from the end portion of one major cutting edge 15b facing the tip end side of the tool main body 21 on the side opposite to the corner edge 15a to the corner edge 15a facing the outer periphery side of the tool main body 21 and a portion of the minor cutting edge 15d extending from the second end of the corner edge 15a on the corner edge 15a side are exclusively used for cutting.

Here, in the portion of the tool main body 21 on the inner periphery side which goes from the end portion of the major cutting edge 15b on the side opposite to the corner edge 15a toward the corner edge 15a side, a relatively thin chip is generated, but in the cutting insert of the fourth embodiment, this portion is the first region in which the rake angle in the cross section along the insert center line L gradually increases, the outflow direction can be controlled to guide the entire chip that is generated in a wide width by giving sharp cutting quality to the major cutting edge 15b to the inner periphery side (the axis O side) of the tool main body 21, that is, to guide the chip to the protrusions 18 side while the cutting edge strength with respect to the thin chip is ensured, and the processing property of the chip can be improved.

Further, the portion that goes from the first region toward the major cutting edge 15b on the corner edge 15a side is the second region in which the rake angle gradually decreases, and it is possible to secure the cutting edge strength and to prevent the fracture or the like against a case in which the thickness of the chip gradually increases as it goes toward the outer periphery side of the tool main body 21 and cutting load or stress increases.

Further, the portion including at least a part of the corner edge 15a and the minor cutting edge 15d from the second region is the third region in which the rake angle gradually increases in the range smaller than that in the first region as it goes toward the minor cutting edge side. Therefore, in the third region which is located on the outermost periphery of the tool main body 21, the rake angle gradually increases as it goes toward the minor cutting edge 15d side while maintaining the cutting edge strength by the rake angle reduced passing through the second region, and thus the chip can be wound into the inner periphery side of the tool main body 21 with a small curl diameter, it is possible to prevent the chip from being caught in combination with the improvement of the chip discharging property by the first region, and a preferable machined face quality can be obtained. Since the rake angle of the cutting edge 15 in the third region is in the range of 15° to 18°, it is possible to more reliably secure the cutting edge strength and to prevent the chip from being caught.

INDUSTRIAL APPLICABILITY

The fracture of the cutting edge due to the chip being caught can be prevented without impairing the mounting stability of the cutting insert on the insert mounting seat even if the high feeding processing, the high cutting operation, or the engraving operation of the pocket is performed, and stable cutting can be performed over a long period of time.

REFERENCE SIGNS LIST

11 Insert main body
12 Polygonal surface
12a Boss surface
12b Inclined portion
13 Side surface
14 Flank face
15 Cutting edge
15a Corner edge
15b Major cutting edge
15c Wiper edge
15d Minor cutting edge
16 Mounting hole
17 Insert constraining surface
18 Protrusion
18a Furthest protruding portion of protrusion 18
19 Protruding ridge portion
19a Inclined face
19b Furthest protruding portion of protruding ridge portion 19
20a First steeply inclined portion
20b Gently inclined portion
20c Second steeply inclined portion
21 Tool main body
22 Insert mounting seat
22a Bottom surface of insert mounting seat 22
22b Wall face of insert mounting seat 22
22c Screw hole
22d Accommodation recess 23 Chip pocket
24 Clamp screw
L Insert center line
O Axis of tool main body 21
T Tool rotation direction

What is claimed is:

1. A cutting insert comprising:
a polygonal plate-shaped insert main body that includes: two polygonal surfaces which have a polygonal shape and of which one serves as a rake face and the other serves as a seating surface; a side surface which is arranged around the two polygonal surfaces and in which a flank face intersecting with the rake face of the polygonal surfaces is formed; and a cutting edge which is formed on an intersecting ridgeline between the rake face and the flank face,
wherein the insert main body has a mounting hole that penetrates the insert main body centered on an insert center line passing through centers of the two polygonal surfaces, has a rotationally symmetrical shape with respect to the insert center line, and has a front-back inversion symmetrical shape with respect to the two polygonal surfaces,
wherein the cutting edge includes at least a corner edge located at a corner of the polygonal surface and a major cutting edge extending from a first end of the corner edge,
wherein, in an opening of the mounting hole in the two polygonal surfaces, a plurality of protrusions protruding with respect to a boss surface formed around the opening of the mounting hole are formed at intervals in a peripheral direction in an inner periphery side region of the major cutting edge, and
wherein, in the protrusions, when seen in a direction facing the polygonal surface, furthest protruding portions which protrude furthest from the boss surface are located between a straight line connecting the first end of the corner edge and the insert center line to each other and a straight line connecting a first end of the major cutting edge on a side opposite to the first end of the corner edge and the insert center line to each other,
in the protrusions, the furthest protruding portions which protrude furthest from the boss surface extend with a predetermined length around the opening of the mounting hole,
the insert main body has a triangular plate shape in which each of the two polygonal surfaces has three corners, and
when seen in the direction facing the polygonal surface, the furthest protruding portions are located in an angle range of 15° to 40° centered on the insert center line from the straight line connecting the first end of the major cutting edge on the side opposite to the first end of the corner edge and the insert center line to each other toward the corner edge side, and
each of the furthest protruding portions is located offset from the corner edge in a peripheral direction of the insert.

2. The cutting insert according to claim 1,
wherein the cutting edge further includes a minor cutting edge extending from a second end of the corner edge toward the other cutting edge adjacent to a second end side of the corner edge, and
wherein the minor cutting edge extends to a region of the boss surface at least on a side opposite to the corner edge, and in a portion extending to the region of the boss surface, the minor cutting edge is formed on an intersecting ridgeline between an inclined face that goes toward the polygonal surface side opposite to the subject polygonal surface as the inclined face goes toward an outer periphery side of the subject polygonal surface and the flank face.

3. The cutting insert according to claim 2,
wherein, in an outer peripheral portion of the polygonal surface, a protruding ridge portion that protrudes with respect to the boss surface is formed along the minor cutting edge of the portion extending to the region of the boss surface, and
wherein the inclined face is formed on an outer peripheral surface of the protruding ridge portion facing the outer periphery side of the polygonal surface.

4. An indexable cutting tool in which the cutting insert according to claim 3 is detachably mounted on an insert mounting seat formed on an outer periphery of a tip end portion of a tool main body which is rotated around an axis in such a manner that a clamp screw which is inserted into the mounting hole is screwed into a screw hole formed in a bottom surface of the insert mounting seat which faces in a tool rotation direction,
wherein, in the insert main body, one polygonal surface of the two polygonal surfaces is caused to serve as a rake face and to face in the tool rotation direction, and the boss surface of the other polygonal surface is closely attached to the bottom surface of the insert mounting seat,
wherein the insert main body is mounted in such a manner that the one corner edge of the one polygonal surface is caused to face an outer periphery side of the tool main body and the one major cutting edge extending from a first end of the one corner edge is caused to face a tip end side of the tool main body, and
wherein, in the bottom surface of the insert mounting seat, accommodation recesses for accommodating the protrusions of the other polygonal surface are formed around an opening of the screw hole.

5. An indexable cutting tool in which the cutting insert according to claim 2 is detachably mounted on an insert mounting seat formed on an outer periphery of a tip end portion of a tool main body which is rotated around an axis in such a manner that a clamp screw which is inserted into the mounting hole is screwed into a screw hole formed in a bottom surface of the insert mounting seat which faces in a tool rotation direction,
wherein, in the insert main body, one polygonal surface of the two polygonal surfaces is caused to serve as a rake face and to face in the tool rotation direction, and the boss surface of the other polygonal surface is closely attached to the bottom surface of the insert mounting seat,
wherein the insert main body is mounted in such a manner that the one corner edge of the one polygonal surface is caused to face an outer periphery side of the tool main body and the one major cutting edge extending from a first end of the one corner edge is caused to face a tip end side of the tool main body, and
wherein, in the bottom surface of the insert mounting seat, accommodation recesses for accommodating the protrusions of the other polygonal surface are formed around an opening of the screw hole.

6. The cutting insert according to claim 1,
wherein the boss surface is a plane perpendicular to the insert center line, and
wherein an inclined portion that is inclined to protrude in a direction of the insert center line as the inclined portion goes from the boss surface toward the cutting edge side is formed on the polygonal surface.

7. The cutting insert according to claim 6, wherein, in a cross section orthogonal to the major cutting edge, the inclined portion has: a first steeply inclined portion that protrudes in the direction of the insert center line as the first steeply inclined portion goes from the boss surface toward the major cutting edge side; a gently inclined portion that is continuous with the first steeply inclined portion on the major cutting edge side and protrudes in the direction of the insert center line at a gradient gentler than the first steeply inclined portion as the gently inclined portion goes toward the major cutting edge side; and a second steeply inclined portion that is continuous with the gently inclined portion on the major cutting edge side and protrudes in the direction of the insert center line at a gradient steeper than the gently inclined portion as the second steeply inclined portion goes toward the major cutting edge side.

8. An indexable cutting tool in which the cutting insert according to claim 7 is detachably mounted on an insert mounting seat formed on an outer periphery of a tip end portion of a tool main body which is rotated around an axis in such a manner that a clamp screw which is inserted into the mounting hole is screwed into a screw hole formed in a bottom surface of the insert mounting seat which faces in a tool rotation direction,
   wherein, in the insert main body, one polygonal surface of the two polygonal surfaces is caused to serve as a rake face and to face in the tool rotation direction, and the boss surface of the other polygonal surface is closely attached to the bottom surface of the insert mounting seat,
   wherein the insert main body is mounted in such a manner that the one corner edge of the one polygonal surface is caused to face an outer periphery side of the tool main body and the one major cutting edge extending from a first end of the one corner edge is caused to face a tip end side of the tool main body, and
   wherein, in the bottom surface of the insert mounting seat, accommodation recesses for accommodating the protrusions of the other polygonal surface are formed around an opening of the screw hole.

9. An indexable cutting tool in which the cutting insert according to claim 4 is detachably mounted on an insert mounting seat formed on an outer periphery of a tip end portion of a tool main body which is rotated around an axis in such a manner that a clamp screw which is inserted into the mounting hole is screwed into a screw hole formed in a bottom surface of the insert mounting seat which faces in a tool rotation direction,
   wherein, in the insert main body, one polygonal surface of the two polygonal surfaces is caused to serve as a rake face and to face in the tool rotation direction, and the boss surface of the other polygonal surface is closely attached to the bottom surface of the insert mounting seat,
   wherein the insert main body is mounted in such a manner that the one corner edge of the one polygonal surface is caused to face an outer periphery side of the tool main body and the one major cutting edge extending from a first end of the one corner edge is caused to face a tip end side of the tool main body, and
   wherein, in the bottom surface of the insert mounting seat, accommodation recesses for accommodating the protrusions of the other polygonal surface are formed around an opening of the screw hole.

10. An indexable cutting tool in which the cutting insert according to claim 1 is detachably mounted on an insert mounting seat formed on an outer periphery of a tip end portion of a tool main body which is rotated around an axis in such a manner that a clamp screw which is inserted into the mounting hole is screwed into a screw hole formed in a bottom surface of the insert mounting seat which faces in a tool rotation direction,
   wherein, in the insert main body, one polygonal surface of the two polygonal surfaces is caused to serve as a rake face and to face in the tool rotation direction, and the boss surface of the other polygonal surface is closely attached to the bottom surface of the insert mounting seat,
   wherein the insert main body is mounted in such a manner that the one corner edge of the one polygonal surface is caused to face an outer periphery side of the tool main body and the one major cutting edge extending from a first end of the one corner edge is caused to face a tip end side of the tool main body, and
   wherein, in the bottom surface of the insert mounting seat, accommodation recesses for accommodating the protrusions of the other polygonal surface are formed around an opening of the screw hole.

11. The cutting insert according to claim 1, wherein protruding heights the furthest protruding portions from the boss surface is in a range of 0.1 mm to 0.15 mm.

12. The cutting insert according to claim 1,
   wherein, in an outer peripheral portion of the polygonal surface, a protruding ridge portion that protrudes with respect to the boss surface is formed along the minor cutting edge of the portion extending to the region of the boss surface,
   the inclined face is formed on an outer peripheral surface of the protruding ridge portion facing the outer periphery side of the polygonal surface,
   the boss surface is a plane perpendicular to the insert center line,
   an inclined portion that is inclined to protrude in a direction of the insert center line as the inclined portion goes from the boss surface toward the cutting edge side is formed on the polygonal surface, and
   the protruding ridge portion and the inclined portion are formed in an inside part of an outer periphery part of the insert alternately.

\* \* \* \* \*